US012793193B2

(12) United States Patent
Lee

(10) Patent No.: US 12,793,193 B2
(45) Date of Patent: Nov. 10, 2026

(54) IMAGE PROCESSING DEVICE AND METHOD FOR IMPROVING PICTURE QUALITY OF IMAGE

(71) Applicant: SAMSUNG ELECTRONICS CO., LTD., Suwon-si (KR)

(72) Inventor: Cheon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/949,750

(22) Filed: Nov. 15, 2024

(65) Prior Publication Data

US 2025/0078228 A1 Mar. 6, 2025

Related U.S. Application Data

(63) Continuation of application No. PCT/KR2023/006449, filed on May 12, 2023.

(30) Foreign Application Priority Data

May 17, 2022 (KR) ........................ 10-2022-0060425
May 2, 2023 (KR) ........................ 10-2023-0057345

(51) Int. Cl.
*G06T 5/92* (2024.01)
*G06T 5/50* (2006.01)
*G06T 5/60* (2024.01)

(52) U.S. Cl.
CPC .................. *G06T 5/92* (2024.01); *G06T 5/50* (2013.01); *G06T 5/60* (2024.01); *G06T 2207/20024* (2013.01); *G06T 2207/20084* (2013.01); *G06T 2207/20212* (2013.01)

(58) Field of Classification Search
None
See application file for complete search history.

(56) References Cited

U.S. PATENT DOCUMENTS 10,460,231 B2 10/2019 Zhang et al.
10,771,755 B2 9/2020 Eto
10,931,853 B2 2/2021 Zhu et al.
2009/0180030 A1 7/2009 Shin et al.
(Continued)

FOREIGN PATENT DOCUMENTS

EP 3 857 506 A1 8/2021
JP 2018-195069 A 12/2018
(Continued)

OTHER PUBLICATIONS

Extended European Search Report dated May 26, 2025, issued by the European Patent Office in European Application No. 23807840.6.

(Continued)

*Primary Examiner* — SJ Park
(74) *Attorney, Agent, or Firm* — Sughrue Mion, PLLC

(57) ABSTRACT

Disclosed is an image processing device and method including obtaining a first differential image having a resolution greater than a resolution of an input image and a parameter value for a tone curve by applying the input image to a neural network, obtaining a plurality of filtered images for different frequency bands by filtering the first differential image, and applying, to each filtered image among the plurality of filtered images, gain values corresponding to a sample value of an edge map of a first image upscaled from the input image.

13 Claims, 15 Drawing Sheets

(56) References Cited

U.S. PATENT DOCUMENTS

| | | | |
|---|---|---|---|
| 2018/0336662 | A1 | 11/2018 | Kimura |
| 2019/0012774 | A1 | 1/2019 | Arai |
| 2020/0160494 | A1 | 5/2020 | Hwang et al. |
| 2020/0218961 | A1 | 7/2020 | Kanazawa et al. |
| 2020/0349677 | A1 | 11/2020 | Lee et al. |
| 2020/0401889 | A1 | 12/2020 | Lee et al. |
| 2021/0168263 | A1 | 6/2021 | Zhu et al. |
| 2021/0287047 | A1 | 9/2021 | Gao et al. |
| 2022/0127258 | A1 | 4/2022 | Yin et al. |
| 2022/0366538 | A1 | 11/2022 | Kim et al. |
| 2023/0177638 | A1 | 6/2023 | Kim et al. |

FOREIGN PATENT DOCUMENTS

| | | | |
|---|---|---|---|
| JP | 2020-87449 | A | 6/2020 |
| JP | 6957197 | B2 | 11/2021 |
| KR | 10-2083835 | B1 | 3/2020 |
| KR | 10-2177233 | B1 | 11/2020 |
| KR | 10-2021-0054554 | A | 5/2021 |
| KR | 10-2021-0123337 | A | 10/2021 |
| KR | 10-2021-0127412 | A | 10/2021 |
| KR | 10-2021-0128605 | A | 10/2021 |
| KR | 10-2327758 | B1 | 11/2021 |
| KR | 10-2022-0000871 | A | 1/2022 |
| KR | 10-2550342 | B1 | 7/2023 |
| WO | 2019/182269 | A1 | 9/2019 |
| WO | 2021/223193 | A1 | 11/2021 |

OTHER PUBLICATIONS

Kim et al. "Accurate Image Super-Resolution Using Very Deep Convolutional Networks", 2016 IEEE Conference on Computer Vision and Pattern Recognition, 2016, XP033021342, pp. 1646-1654 (9 pages total).

"bacondither/ Adaptive-sharpen Image sharpening shader", Github, 2018, XP093277908, pp. 1-2 (2 pages total).

Gharbi et al. "Deep Bilateral Learning for Real-Time Image Enhancement", ACM Transactions on Graphics, 2017, vol. 36, No. 4, pp. 1-12 (12 pages total).

International Search Report dated Aug. 7, 2023 issued by International Searching Authority in International Application No. PCT/KR2023/006449.

Kim et al., "JSI-GAN: GAN-Based Joint Super-Resolution and Inverse Tone-Mapping with Pixel-Wise Task-Specific Filters for UHD HDR Video", The Thirty-Fourth AAAI Conference on Artificial Intelligence, 2020, pp. 11287-11295 (9 pages total).

Communication issued Oct. 2, 2025 by the European Patent Office in European Patent Application No. 23807840.6.

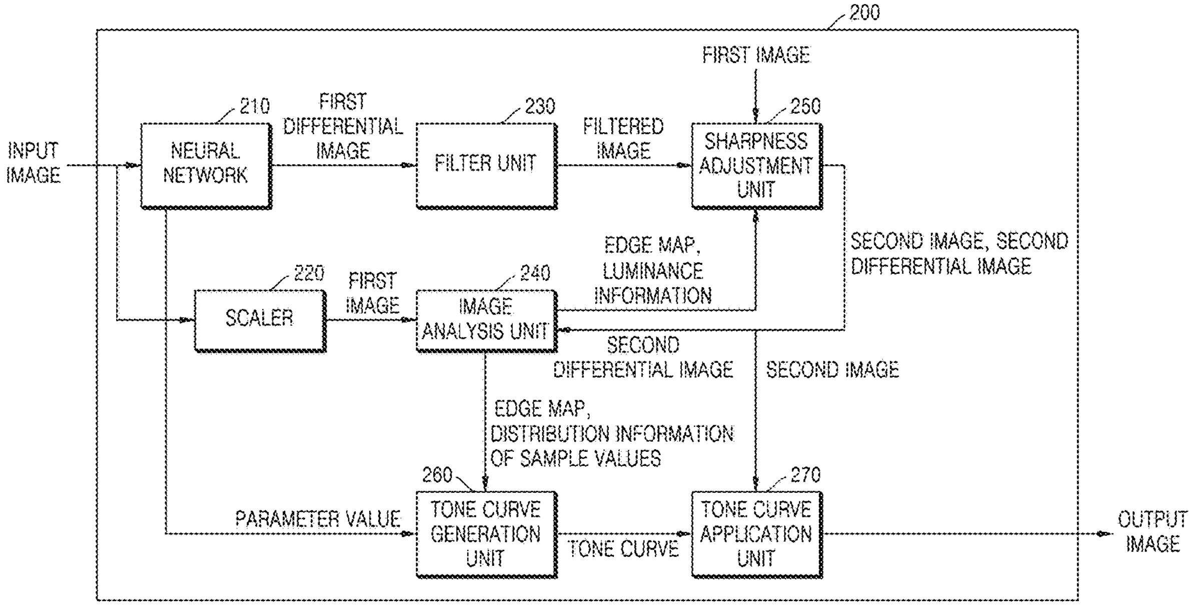
200
INPUT IMAGE
NEURAL NETWORK
210
FIRST DIFFERENTIAL IMAGE
FILTER UNIT
230
FILTERED IMAGE
FIRST IMAGE
SHARPNESS ADJUSTMENT UNIT
250
SECOND IMAGE, SECOND DIFFERENTIAL IMAGE
SCALER
220
FIRST IMAGE
IMAGE ANALYSIS UNIT
240
EDGE MAP, LUMINANCE INFORMATION
SECOND DIFFERENTIAL IMAGE
SECOND IMAGE
EDGE MAP, DISTRIBUTION INFORMATION OF SAMPLE VALUES
PARAMETER VALUE
TONE CURVE GENERATION UNIT
260
TONE CURVE
TONE CURVE APPLICATION UNIT
270
OUTPUT IMAGE

IMAGE PROCESSING DEVICE AND METHOD FOR IMPROVING PICTURE QUALITY OF IMAGE

CROSS-REFERENCE TO RELATED APPLICATIONS

This application is a bypass continuation application of International Application No. PCT/KR2023/006449, filed on May 12, 2023, which is based on and claims priority to Korean Patent Application No. 10-2022-0060425, filed on May 17, 2022, in the Korean Patent Office, and Korean Patent Application No. 10-2023-0057345, filed on May 2, 2023, in the Korean Patent Office, the disclosures of which are incorporated by reference herein in their entireties.

BACKGROUND

1. Field

The disclosure relates to the field of image processing, and more particularly, to an image processing device and method for improving image quality.

2. Description of Related Art

Recently, various image processing algorithms using neural networks have been developed. Deep learning-based image processing methods using training data may solve various problems that could not be solved by traditional methods.

Recent research is being conducted towards changing the algorithms for improving image quality from traditional linear systems to neural network-based learnable systems.

For example, image super-resolution technology using a neural network is technology that learns the differences between low-resolution images and high-resolution images and obtains clearer and more detailed high-resolution images from low-resolution images. As such super-resolution technology has to restore high-frequency components that do not exist in low-resolution images, it may be generally designed as a multi-convolutional layer structure.

In addition, as an example, contrast expansion technology using a neural network is technology that analyzes an image through the neural network, infers a pixel-to-pixel mapping function (or mapping curve), and obtains a three-dimensional image by applying the inferred mapping function to the image.

To install high-complexity neural network-based algorithms on image processing products, it is very important to make neural networks lightweight. However, in traditional image processing, it is not easy to achieve lightweight neural networks.

FIG. 1 is a diagram illustrating image processing applicable to an image processing product, such as a television (TV).

As illustrated in FIG. 1, an output image may be obtained by sequentially applying a noise cancellation algorithm 1, an upscaling algorithm 2, a sharpness enhancement algorithm 3, a contrast enhancement algorithm 4, and a color expansion algorithm 5 to an input image.

Although the performance of algorithms may be improved by implementing algorithms used in image processing as neural network-based algorithms, there is a problem in that hardware complexity increases significantly due to neural networks for the algorithms.

In addition, there is a problem that it is difficult to consider features of images input to a first algorithm because algorithms subsequent to the first algorithm receive an image output from the previous algorithm.

Therefore, there is a need for a method capable of significantly improving image quality while achieving lightweight neural networks.

SUMMARY

According to an aspect of the disclosure, there is provided an image processing device including: a memory configured to store at least one instruction; and at least one processor, wherein the at least one instruction, when executed by the at least one processor, causes the image processing device to: obtain a first differential image having a resolution greater than a resolution of an input image and a parameter value for a tone curve by applying the input image to a neural network; obtain a plurality of filtered images for different frequency bands by filtering the first differential image; apply, to each filtered image among the plurality of filtered images, gain values corresponding to a sample value of an edge map of a first image upscaled from the input image; obtain a second differential image by combining the plurality of filtered images to which the gain values are applied; obtain a second image by combining the second differential image with the first image; apply, to the parameter value, a gain value corresponding to an average sample value of the edge map; identify a tone curve from the parameter value to which the gain value is applied; and obtain an output image by changing sample values of the second image according to the identified tone curve.

The neural network may include: a first sub-neural network configured to output a feature map by processing the input image; a second sub-neural network configured to output the first differential image by processing the feature map output from the first sub-neural network; and a third sub-neural network configured to output the parameter value by processing the feature map output from the first sub-neural network.

The gain values corresponding to the sample value of the edge map may include a first gain value applied to a first filtered image for a first frequency band and a second gain value applied to a second filtered image for a second frequency band, wherein the first frequency band is greater than the second frequency band, and wherein based on the sample value of the edge map being greater than a preset value, the first gain value is determined to be greater than the second gain value.

The at least one instruction, when executed by the at least one processor, causes the image processing device to: change the second differential image according to luminance information of the first image; and obtain the second image by combining the changed second differential image with the first image.

The luminance information may include a luminance value of the first image, and wherein the at least one instruction, when executed by the at least one processor, causes the image processing device to apply, to a sample of the second differential image, a gain value corresponding to the luminance value.

The at least one instruction, when executed by the at least one processor, causes the image processing device to: adjust the identified tone curve according to distribution information of sample values of the second differential image; and obtain the output image by changing the sample values of the second image according to the adjusted tone curve.

The distribution information of the sample values may include an average value of squares of the sample values of the second image, and wherein the at least one instruction, when executed by the at least one processor, causes the image processing device to adjust the tone curve by applying a gain value corresponding to the average value to output sample values mapped to input sample values of the tone curve.

The tone curve may include tone curves respectively corresponding to blocks of the second image, and wherein the at least one instruction, when executed by the at least one processor, causes the image processing device to: obtain a first output sample corresponding to a current sample according to a tone curve corresponding to a current block including a current sample of the second image; obtain second output samples corresponding to the current sample according to tone curves corresponding to neighboring blocks adjacent to the current block; and obtain a final output sample of the output image corresponding to the current sample by performing a weighted sum on the first output sample and the second output samples according to a distance between the current sample and a center sample of the current block and distances between the current sample and center samples of the neighboring blocks.

According to an aspect of the disclosure, there is provided an image processing method performed by an image processing device, the image processing method including: obtaining a first differential image having a resolution greater than a resolution of an input image and a parameter value for a tone curve by applying the input image to a neural network; obtaining a plurality of filtered images for different frequency bands by filtering the first differential image; applying, to each filtered image among the plurality of filtered images, gain values corresponding to a sample value of an edge map of a first image upscaled from the input image; obtaining a second differential image by combining the plurality of filtered images to which the gain values are applied; obtaining a second image by combining the second differential image with the first image; applying, to the parameter value, a gain value corresponding to an average sample value of the edge map; identifying a tone curve from the parameter value to which the gain value is applied; and obtaining an output image by changing sample values of the second image according to the identified tone curve.

The gain values corresponding to the sample value of the edge map may include a first gain value applied to a first filtered image for a first frequency band and a second gain value applied to a second filtered image for a second frequency band, wherein the first frequency band is greater than the second frequency band, and wherein based on the sample value of the edge map being greater than a preset value, the first gain value is determined to be greater than the second gain value.

The obtaining of the second image may include: changing the second differential image according to luminance information of the first image; and obtaining the second image by combining the changed second differential image with the first image.

The obtaining of the output image may include: adjusting the determined tone curve according to distribution information of sample values of the second differential image; and obtaining the output image by changing the sample values of the second image according to the adjusted tone curve.

According to an aspect of the disclosure, there is provided a non-transitory computer-readable recording medium having recorded thereon a program for causing a computer to perform an image processing method including: obtaining a first differential image having a resolution greater than a resolution of an input image and a parameter value for a tone curve by applying the input image to a neural network; obtaining a plurality of filtered images for different frequency bands by filtering the first differential image; applying, to each filtered image among the plurality of filtered images, gain values corresponding to a sample value of an edge map of a first image upscaled from the input image; obtaining a second differential image by combining the plurality of filtered images to which the gain values are applied; obtaining a second image by combining the second differential image with the first image; applying, to the parameter value, a gain value corresponding to an average sample value of the edge map; identifying a tone curve from the parameter value to which the gain value is applied; and obtaining an output image by changing sample values of the second image according to the identified tone curve.

BRIEF DESCRIPTION OF DRAWINGS

The above and other aspects and/or features of one or more embodiments of the disclosure will be more apparent from the following detailed description, taken in conjunction with the accompanying drawings, in which:

FIG. 2 is a block diagram illustrating a configuration of an image processing device, according to an embodiment;

DETAILED DESCRIPTION

Figure 1:
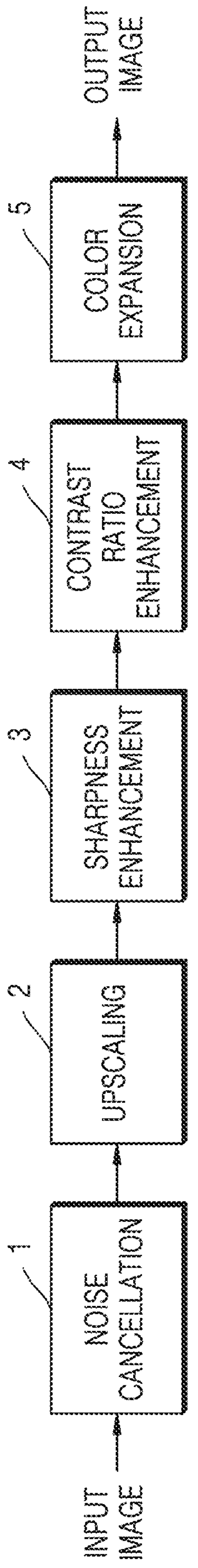
FIG. 1 is a diagram illustrating an example of image processing applicable to an image processing product.

As the present disclosure allows for various changes and numerous embodiments, certain embodiments will be illustrated in the drawings and described in detail in the detailed description. However, this is not intended to limit the embodiments of the present disclosure, and the present disclosure includes all modifications, equivalents, and substitutes falling within the spirit and technical scope of various embodiments.

In describing embodiments, when the detailed description of the relevant known technology is determined to unnecessarily obscure the gist of the present disclosure, the detailed description thereof is omitted herein. Also, numbers (e.g., first, second, etc.) used in the description of embodiments correspond to identification symbols for distinguishing one element from another.

Throughout the present disclosure, the expression "at least one of a, b or c" indicates only a, only b, only c, both a and b, both a and c, both b and c, all of a, b, and c, or variations thereof.

When one element is referred to as being "connected" or "coupled" to another element, the one element may be directly connected or coupled to the other element, but the elements may be connected or coupled to each other via an intervening element therebetween unless otherwise stated.

Also, an element represented by "unit," "module," etc. in the present disclosure may be one element in which two or more elements are combined, or may be divided into two or more element for each more subdivided function. Also, each of the elements to be described below may additionally perform, in addition to the main function thereof, some or all of the functions that other elements are responsible for, and some of the main functions that the respective elements are responsible for may be dedicated by other elements.

In the present disclosure, an 'image' may represent a still image (or frame), a moving image composed of a plurality of consecutive still images, or a video.

In the present disclosure, a 'neural network' is a representative example of an artificial neural network model that simulates brain nerves, and is not limited to an artificial neural network model using a specific algorithm. The neural network may also be referred to as a deep neural network.

In the present disclosure, 'neural network parameters' are values used in a computational process of each layer constituting a neural network and may include, for example, weights and/or biases used when applying input values to a certain computational formula. The neural network parameters are values set as a result of training and may be updated through separate training data as needed.

In the present disclosure, an 'input image' refers to an image input to an image processing device as an image to be processed, and a 'first image' refers to an image upscaled from the input image. In addition, a 'second image' refers to an image obtained through a sharpness enhancement process, and a 'third image' refers to an image obtained through a contrast enhancement process. In addition, an 'output image' refers to an image output from an image processing device. According to an embodiment, the third image may correspond to the output image.

In the present disclosure, a 'sample' refers to data to be processed as data assigned to a sampling location of an image and a feature map. For example, a pixel in a frame of a spatial domain may correspond to the sample. A unit including a plurality of samples may be defined as a block.

In the present disclosure, a 'tone curve' refers to information indicating a mapping relationship between input sample values and output sample values. For example, a sample value of an image may be converted into one of a plurality of output sample values according to a mapping relationship represented by a tone curve.

Hereinafter, an image processing device and an image processing method according to an embodiment are described with reference to FIGS. 2 to 14.

FIG. 2 is a block diagram illustrating a configuration of an image processing device 200 according to an embodiment.

Referring to FIG. 2, the image processing device 200 may include a neural network 210, a scaler 220, a filter unit 230, an image analysis unit 240, a sharpness adjustment unit 250, a tone curve generation unit 260, and a tone curve application unit 270.

The scaler 220, the filter unit 230, the image analysis unit 240, the sharpness adjustment unit 250, the tone curve generation unit 260, and the tone curve application unit 270 may be implemented as one or more processors.

The scaler 220, the filter unit 230, the image analysis unit 240, the sharpness adjustment unit 250, the tone curve generation unit 260, and the tone curve application unit 270 may operate according to instructions stored in a memory.

In an embodiment, the neural network 210 may be stored in the memory. In an embodiment, the neural network 210 may be implemented as at least one dedicated processor for artificial intelligence (AI).

The image processing device 200 may process an input image and output an output image as a result of the processing. As described below, the output image may have a resolution greater than a resolution of the input image and may have improved sharpness and contrast ratio, compared to the input image.

The output image may be reproduced by the image processing device 200 or may be transmitted to a separate display device for reproduction.

Regarding the operation of the image processing device 200, the input image may be processed by the neural network 210, and the neural network 210 may output a first differential image having a resolution greater than a resolution of the input image and a parameter value for a tone curve.

As described below with reference to FIG. 11, the neural network 210 may be trained to output an image similar to a differential image between a ground truth (GT) image having a resolution greater than a resolution of the input image and an image upscaled from the input image.

The image processing device 200 according to an embodiment may obtain an output image with improved sharpness by processing the first differential image using a method described below and then combining the first differential image with the first image, instead of combining the first differential image output from the neural network 210 with the image upscaled from the input image (the first image illustrated in FIG. 2).

In an embodiment, the neural network 210 may include a first sub-neural network that processes an input image and outputs a feature map, a second sub-neural network that processes the feature map output from the first sub-neural network and outputs a first differential image, and a third sub-neural network that processes the feature map output from the first sub-neural network and outputs a parameter value.

An example of the structure of the neural network 210 is described with reference to FIG. 3.

Figure 3:
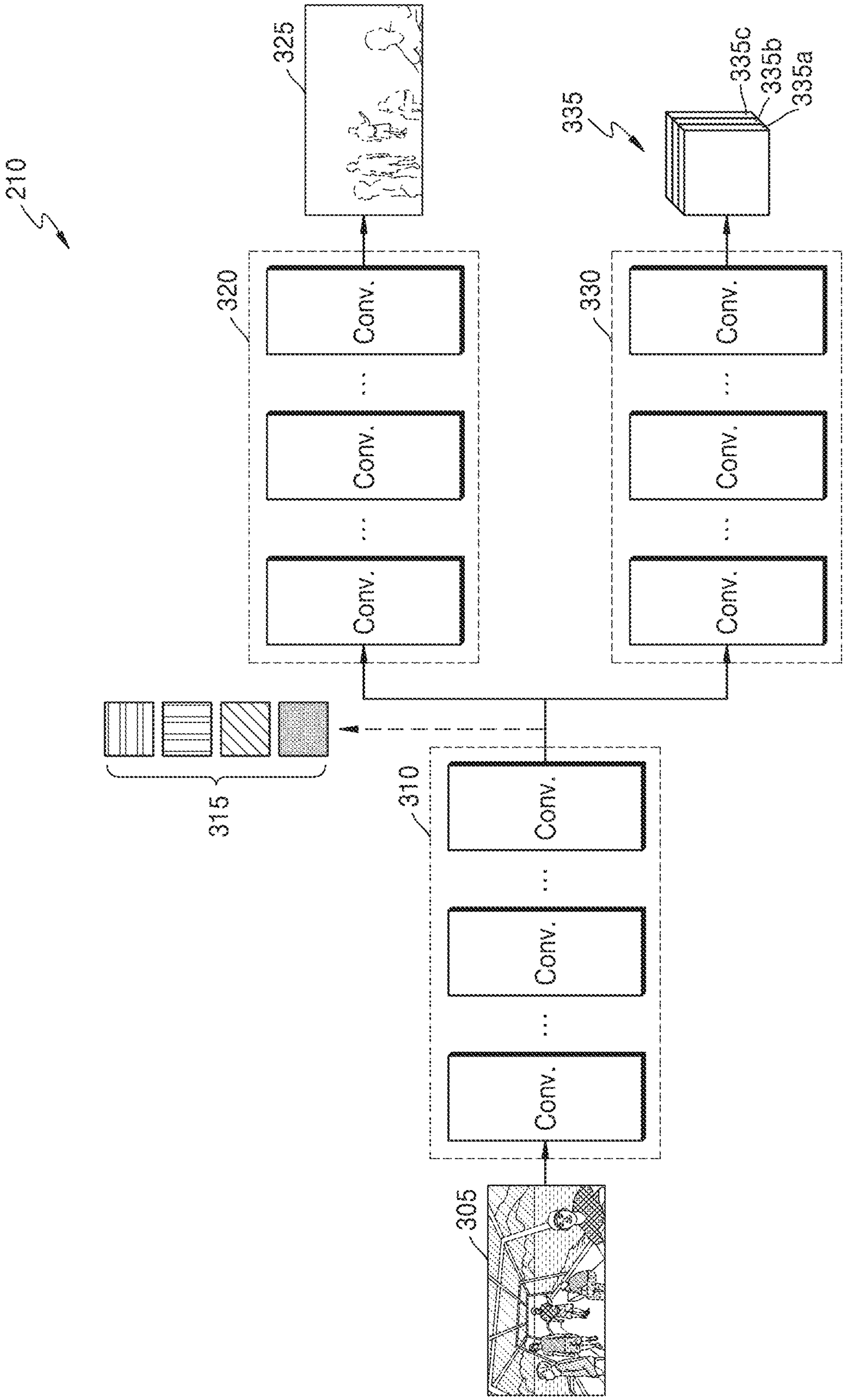
FIG. 3 is a diagram for describing a neural network, according to an embodiment.

Referring to FIG. 3, a first sub-neural network 310, a second sub-neural network 320, and a third sub-neural network 330 may include one or more convolutional layers.

In an embodiment, at least one of the first sub-neural network 310, the second sub-neural network 320, and the third sub-neural network 330 may be implemented as a fully connected layer (FCL) or a recurrent neural network (RNN).

The first sub-neural network 310 may process an input image 305 through a convolutional layer and output a feature map 315 corresponding to the input image 305.

The feature map 315 may represent unique characteristics of the input image 305. For example, the feature map 315 may represent vertical direction characteristics, horizontal direction characteristics, or edge characteristics of the input image 305.

FIG. 3 illustrates that four feature maps 315 are output from the first sub-neural network 310, but this is only an example, and the number of feature maps output from the first sub-neural network 310 may vary depending on the number of filter kernels of the last convolutional layer of the first sub-neural network 310.

The feature map 315 output from the first sub-neural network 310 may be input to the second sub-neural network 320 and the third sub-neural network 330.

The second sub-neural network 320 may process the input feature map 315 through a convolution layer and output a first differential image 325 having a resolution greater than a resolution of the input image 305.

The third sub-neural network 330 may process the input feature map 315 through a convolutional layer and output one or more parameter maps 335 including parameter values for a tone curve.

FIG. 3 illustrates that three parameter maps 335*a*, 335*b*, and 335*c* are output from the third sub-neural network 330, and each of the parameter maps 335*a*, 335*b*, and 335*c* may include parameter values necessary for inferring a tone curve.

For example, the first parameter map 335*a* may include first parameter values indicating a position of a downward convex point of the tone curve, the second parameter map 335*b* may include second parameter values indicating a position of an inflection point of the tone curve, and the third parameter map 335*c* may include third parameter values indicating a position of an upward convex point of the tone curve.

In an embodiment, the tone curve generation unit 260 may determine one first average parameter value, one second average parameter value, and one third average parameter value by averaging the values included in each of the first parameter map 335*a*, the second parameter map 335*b*, and the third parameter map 335*c*. One tone curve may be generated from the one first average parameter value, the one second average parameter value, and the one third average parameter value.

In addition, in an embodiment, the tone curve generation unit 260 may determine a block-wise first average parameter value, a block-wise second average parameter value, and a block-wise third average parameter value by averaging the values included in each of the first parameter map 335*a*, the second parameter map 335*b*, and the third parameter map 335*c* for each block. A block-wise tone curve may be generated from the block-wise first average parameter value, the block-wise second average parameter value, and the block-wise third average parameter value.

Figure 4:
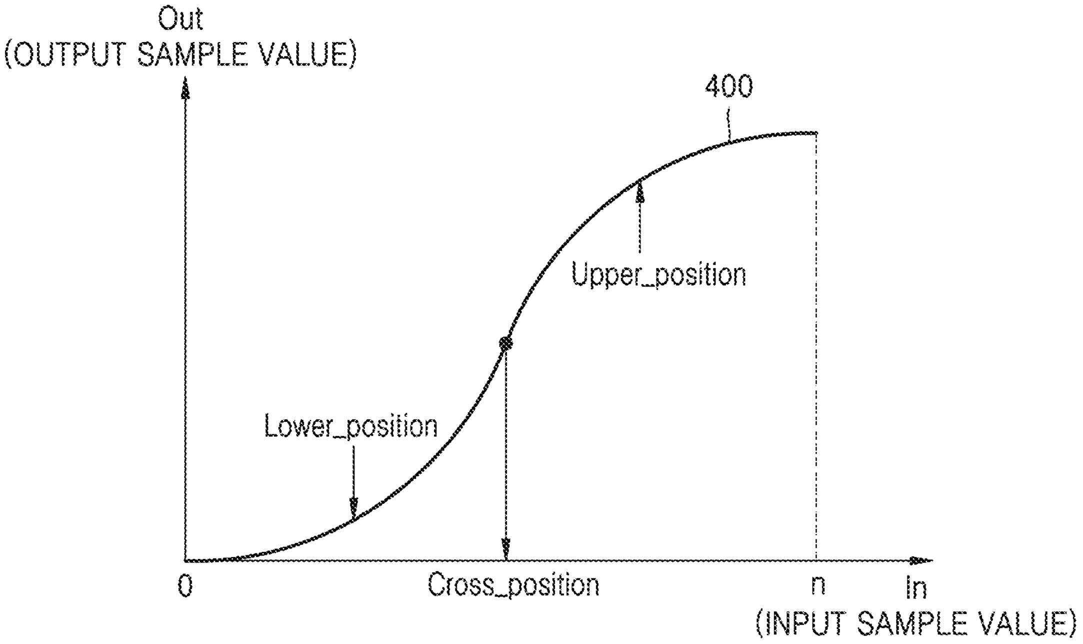
FIG. 4 is a diagram illustrating a tone curve, according to an embodiment.

FIG. 4 is a diagram illustrating a tone curve 400 generated according to parameter values, according to an embodiment.

Referring to FIG. 4, the tone curve 400 may be determined through a curve fitting algorithm, based on a first parameter value Lower_position, a second parameter value Cross_position, and a third parameter value Upper_position.

In the tone curve 400 shown in FIG. 4, the horizontal axis may represent an input sample value, and the vertical axis may represent an output sample value.

In an embodiment, the first parameter value Lower_position may represent an intermediate value between 0 and the second parameter value Cross_position, and the third parameter value Upper_position may represent an intermediate value between n and the second parameter value Cross_position. For example, when the second parameter value Cross_position is m, the first parameter value Lower_position may be m/2 and the third parameter value Upper_position may be (n−m)/2.

When the tone curve 400 is applied to an image, sample values of the image may be changed to output sample values mapped to the sample values.

As described below, the image processing device 200 may modify the first parameter value (or the first average parameter value), the second parameter value (or the second average parameter value), and the third parameter value (or the third average parameter value), based on the features of the image, and may generate a tone curve from the modified parameter values, and thus, the contrast ratio of the output image may be further improved.

In an embodiment, the image processing device 200 may include at least one arithmetic logic unit (ALU) for the convolution processing described above. The ALU may be implemented as one or more processors. For the convolution processing, the ALU may include a multiplier that performs a product operation between sample values of an input image or a feature map and sample values of a filter kernel, and an adder that adds the resulting values of the product.

Referring again to FIG. 2, separately from the input image being processed by the neural network 210, the input image may be scaled by the scaler 220 to obtain a first image having a resolution greater than a resolution of the input image. The resolution of the first image may be equal to the resolution of the first differential image.

In an embodiment, the scaler 220 may apply legacy scaling (or rule-based scaling) to the input image. The legacy scaling may include, for example, at least one of bilinear scaling, bicubic scaling, Lanczos scaling, or stair step scaling.

The first differential image output by the neural network 210 may be input to the filter unit 230. The filter unit 230 may obtain a plurality of filtered images for different frequency bands by filtering the first differential image.

Among the filtered images, a first filtered image may be for a first frequency band and a second filtered image may be for a second frequency band. Here, the second frequency band may be greater than the first frequency band. That is, the first filtered image may be for a low-frequency band and the second filtered image may be for a high-frequency band.

In an embodiment, when the number of filtered images obtained by the filter unit 230 is three, a first filtered image may be for a first frequency band, a second filtered image may be for a second frequency band, and a third filtered image may be for a third frequency band. Here, the first frequency band may be less than the second frequency band and the second frequency band may be less than the third frequency band.

The filter unit 230 may obtain a plurality of filtered images by using one or more filters. An example of a method of obtaining a plurality of filtered images is described with reference to FIG. 5.

Figure 5:
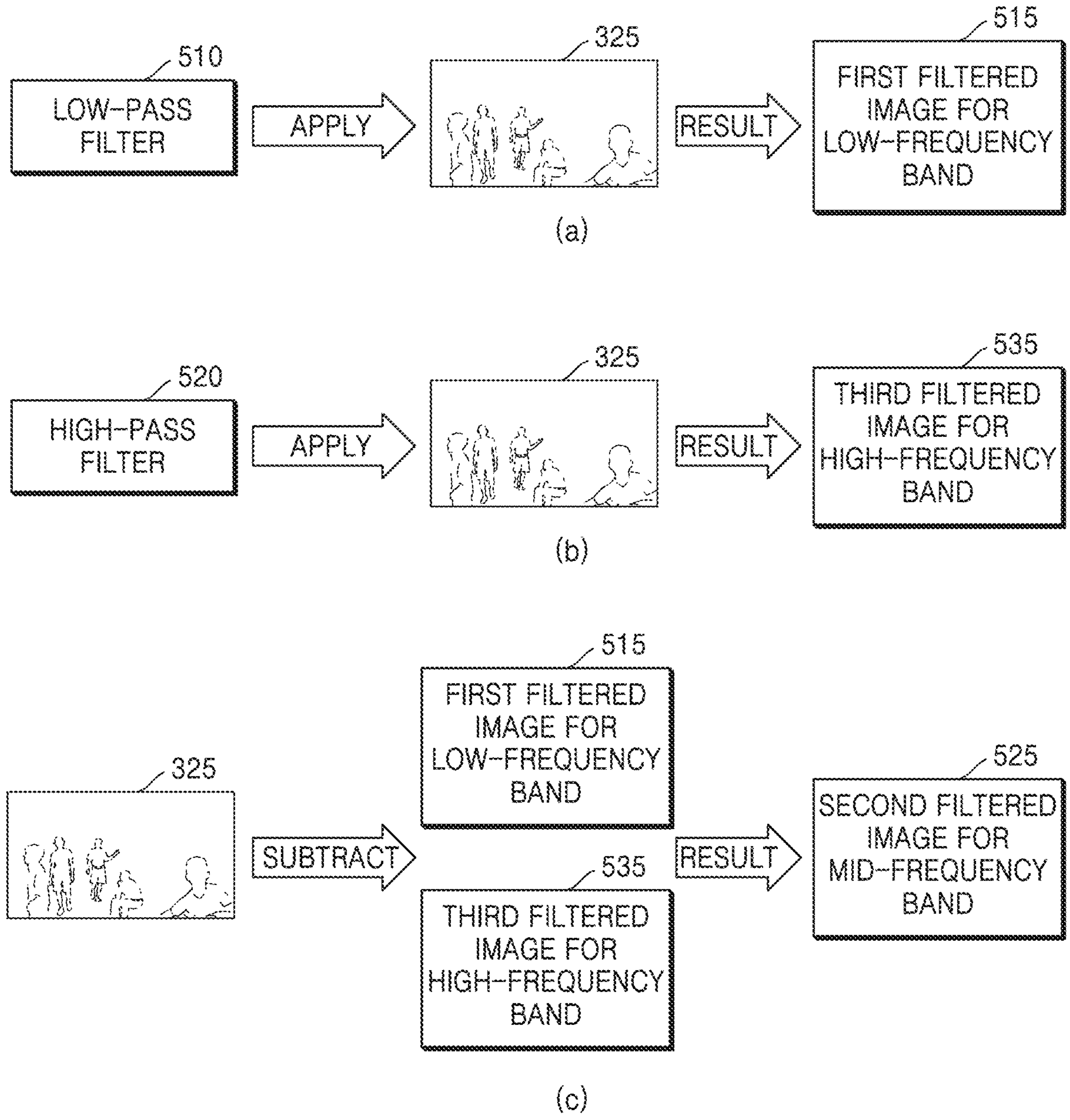
FIG. 5 is a diagram for describing a method of generating a plurality of filtered images from a first differential image, according to an embodiment.

Referring to (a) of FIG. 5, the filter unit 230 may obtain a first filtered image 515 for a low-frequency band by processing a first differential image 325 with a low-pass filter 510.

Referring to (b) of FIG. 5, the filter unit 230 may obtain a third filtered image 535 for a high-frequency band by processing the first differential image 325 with a high-pass filter 520.

At least one of the low-pass filter 510 and the high-pass filter 520 may be implemented as a Gaussian filter. The first filtered image 515 including low-frequency band components of the first differential image 325 and the third filtered image 535 including high-frequency band components thereof may be obtained by adjusting the Gaussian filter.

Next, referring to (c) of FIG. 5, the filter unit 230 may obtain a second filtered image 525 for a mid-frequency band by subtracting the first filtered image 515 and the third filtered image 535 from the first differential image 325.

In one embodiment, the filter unit 230 may obtain the second filtered image 525 for the mid-frequency band by applying a mid-pass filter (or a band-pass filter) to the first differential image 325. In this case, the mid-pass filter may be implemented as a Gaussian filter.

Referring again to FIG. 2, the first image obtained by the scaler 220 is transmitted to the image analysis unit 240, and the image analysis unit 240 obtains feature information of the first image and transmits the feature information of the first image to the sharpness adjustment unit 250.

The image analysis unit 240 may provide an edge map of the first image to the sharpness adjustment unit 250 as a feature of the first image.

In an embodiment, the image analysis unit 240 may generate an edge map indicating samples corresponding to edges among samples of the first image. Sample values in the edge map may represent edge strengths of the samples of the first image. For example, when the sample value at a certain position in the edge map is large, it may indicate that the edge strength of the sample at the same position in the first image is large. Here, a large edge strength may mean that the amount of change in the sample value at a specific position within the first image and neighboring sample values thereof is large.

In an embodiment, the image analysis unit 240 may provide luminance information of the first image to the sharpness adjustment unit 250 as a feature of the first image.

In an embodiment, the luminance information of the first image may include luminance values of samples of the first image. In an embodiment, the luminance information of the first image may include an average luminance value of samples included in each of blocks of a certain size within the first image.

The sharpness adjustment unit 250 may modify a plurality of filtered images according to the feature information of the first image provided from the image analysis unit 240.

A process of processing a plurality of filtered images, according to an embodiment, is described with reference to FIGS. 6A, 6B, and 7.

Figure 6A:
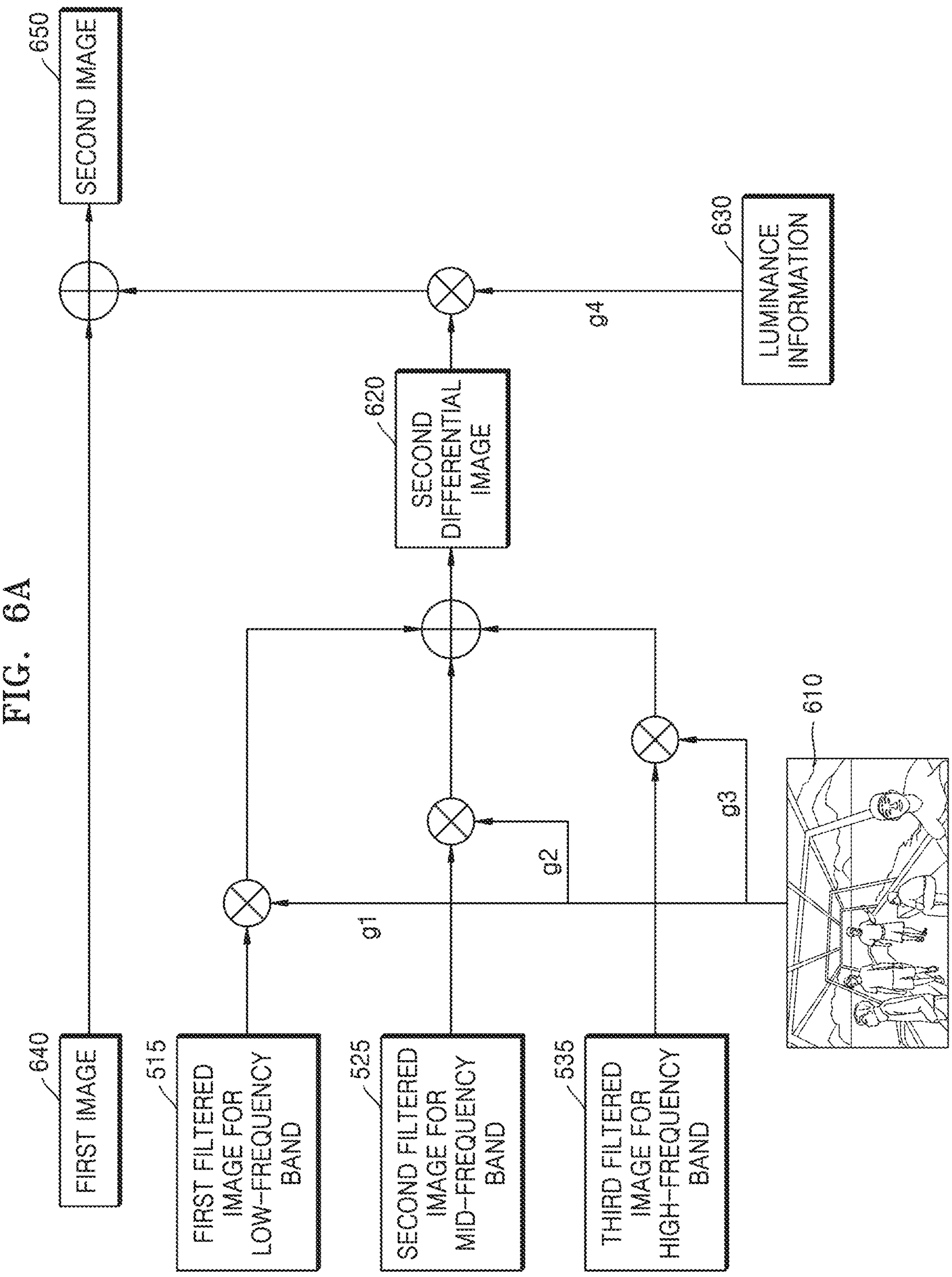
FIG. 6A is a diagram for describing a process of processing a plurality of filtered images, according to an embodiment.

FIG. 6A is a diagram for describing a process of processing a plurality of filtered images, according to an embodiment.

The sharpness adjustment unit 250 may determine a first gain value g1, a second gain value g2, and a third gain value g3 to be applied to a first filtered image 515, a second filtered image 525, and a third filtered image 535 according to sample values of an edge map 610. The first gain value g1, the second gain value g2, and the third gain value g3 may be respectively multiplied by a sample value of the first filtered image 515, a sample value of the second filtered image 525, and a sample value of the third filtered image 535.

In an embodiment, the first gain value g1, the second gain value g2, and the third gain value g3 may be determined on a sample basis. That is, the sharpness adjustment unit 250 may determine the sample-wise first gain value g1, the sample-wise second gain value g2, and the sample-wise third gain value g3 from the sample values of the edge map 610. In this case, the sample-wise first gain value g1 may be applied to each sample of the first filtered image 515, the sample-wise second gain value g2 may be applied to each sample of the second filtered image 525, and the sample-wise third gain value g3 may be applied to each sample of the third filtered image 535.

In an embodiment, the first gain value g1, the second gain value g2, and the third gain value g3 may be determined on a block basis. The sharpness adjustment unit 250 may determine the block-wise first gain value g1, the block-wise second gain value g2, and the block-wise third gain value g3 respectively corresponding to the block-wise average sample values of the edge map 610. In this case, the block-wise first gain value g1 may be applied to each block of the first filtered image 515, the block-wise second gain value g2 may be applied to each block of the second filtered image 525, and the block-wise third gain value g3 may be applied to each block of the third filtered image 535.

The first gain value g1, the second gain value g2, and the third gain value g3 respectively applied to the first filtered image 515, the second filtered image 525, and the third filtered image 535 may be determined to emphasize sharpness of a second image 650.

The third filtered image 535 includes high-frequency components in the first differential image, and the high-frequency components represent a portion with a large amount of change in the first difference image, and thus, a large third gain value may be determined from a large sample value in the edge map 610. Accordingly, high-frequency components in the second image 650 may be emphasized.

For example, when a sample value within the edge map 610 is greater than a predetermined value, the third gain value may be determined to be greater than the second gain value from the sample value, and the second gain value may be determined to be greater than the first gain value. Accordingly, sample values in the third filtered image 535 may change significantly for samples with high edge strength. In addition, for example, when a sample value within the edge map 610 is less than a predetermined value, the first gain value may be determined to be greater than the second gain value from the sample value, and the second gain value may be determined to be greater than the third gain value. Accordingly, sample values in the first filtered image 515 may change significantly for samples with low edge strength.

As another example, when a sample value within the edge map 610 is greater than a predetermined value, the first gain value may be determined to be greater than the second gain value from the sample value, and the second gain value may be determined to be greater than the third gain value. In addition, when a sample value within the edge map 610 is less than a predetermined value, the third gain value may be determined to be greater than the second gain value from the sample value, and the second gain value may be determined to be greater than the first gain value.

Figure 6B:
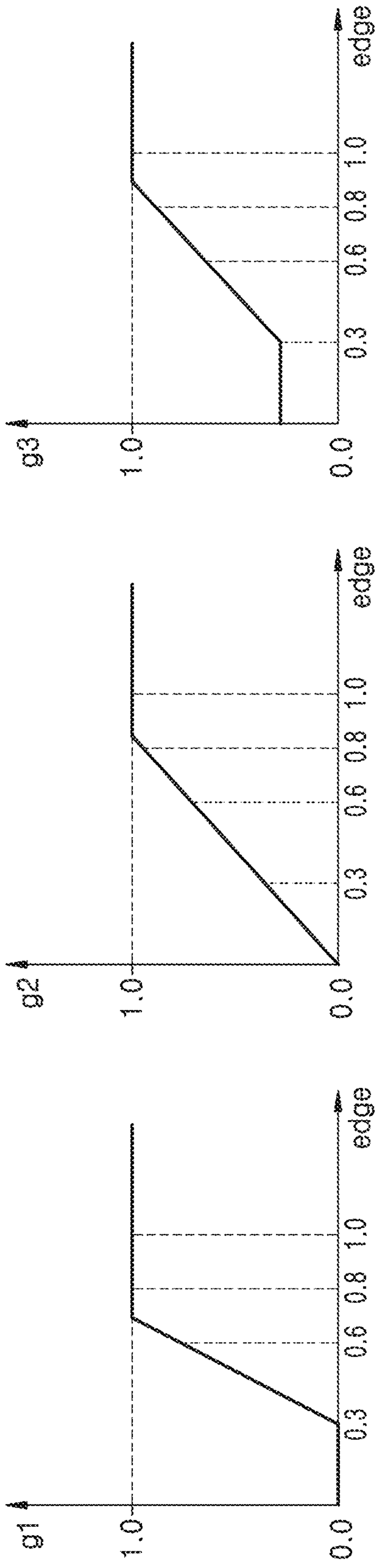
FIG. 6B is a diagram for describing a relationship between a sample value of an edge map and gain values applied to a plurality of filtered images, according to an embodiment.

FIG. 6B is a diagram for describing a relationship between the sample value of the edge map 610 and the gain values g1, g2, and g3 applied to the filtered images 515, 525, and 535, according to an embodiment.

In FIG. 6B, values of an edge axis may correspond to sample values of the edge map 610 normalized to 1.

Referring to FIG. 6B, for example, when the edge value is less than 0.3, the third gain value g3 may be greater than the second gain value g2 and the second gain value g2 may be greater than the first gain value g1. In addition, for example, when the edge value is greater than or equal to 0.6 and less than 0.8, the first gain value g1 may be greater than the second gain value g2 and the second gain value g2 may be greater than the third gain value g3.

Referring again to FIG. 6A, the first filtered image 515, the second filtered image 525, and the third filtered image 535, to which the first gain value g1, the second gain value g2, and the third gain value g3 are respectively applied, may be combined to obtain the second differential image 620. Here, the combining may mean adding the sample values of the same positions in the images.

In an embodiment, the second differential image 620 may be modified based on luminance information 630 of a first image 640. For example, the sharpness adjustment unit 250 may determine fourth gain values g4 from luminance values of samples of the first image 640 and apply the fourth gain values g4 to each of the samples of the second differential image 620. In this case, the number of fourth gain values g4 may be equal to the number of samples of the second differential image 620.

In addition, for example, the sharpness adjustment unit 250 may determine the fourth gain values g4 from block-wise average luminance values of the first image 640 and apply the fourth gain values g4 to each of the blocks of the second differential image 620. In this case, the number of fourth gain values g4 may be equal to the number of blocks of the second differential image 620.

The fourth gain value g4 is intended to improve the sharpness of the second image 650. The fourth gain value g4 may be determined to be great for bright portions in the first image 640, and the fourth gain value g4 may be determined to be less for dark portions in the first image 640. As users tend to focus on bright portions rather than dark portions in an image, the sample values of regions in the second differential image 620 corresponding to bright regions in the first image 640 are increased.

Figure 7:
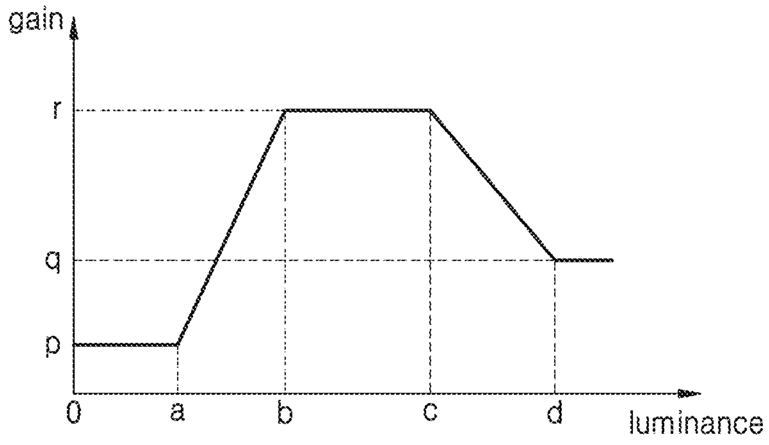
FIG. 7 is a diagram for describing a relationship between a luminance value of a first image and a gain value applied to a second differential image, according to an embodiment.

FIG. 7 is a diagram for describing a relationship between the luminance value of the first image 640 and the gain value applied to the second differential image 620, according to an embodiment.

Referring to FIG. 7, when the luminance value is within a range of 0 to a, the fourth gain value may be determined as p, when the luminance value is within a range of b to c, the fourth gain value may be determined as r, and when the luminance value is greater than or equal to d, the fourth gain value may be determined as q.

In addition, when the luminance value is within a range of a to b, the fourth gain value may linearly increase as the luminance value increases, and when the luminance value is within a range of c to d, the fourth gain value may linearly decrease as the luminance value increases.

In FIG. 7, the fourth gain value is the greatest when the luminance value is within a range of b to c. Accordingly, in an embodiment disclosed in FIG. 7, it may be understood that sharpness of a region with an intermediate luminance is increased.

According to an embodiment, as the fourth gain value is adaptively determined according to the magnitude of the luminance value of the first image 640, the second image 650 with improved sharpness may be obtained.

After the fourth gain value g4 is applied to the second differential image 620, the second differential image 620 may be combined with the first image 640. As a result of the combining, the second image 650 with improved sharpness may be obtained.

In an embodiment, the first filtered image 515, the second filtered image 525, and the third filtered image 535, to which the first gain value g1, the second gain value g2, and the third gain value g3 are respectively applied, may be combined, and then, combined with the first image 640 to obtain the second image 650. That is, the process of applying the fourth gain value g4 to the second differential image 620, based on the luminance information, may be omitted.

Referring again to FIG. 2, each of the second differential image and the second image, which are output from the sharpness adjustment unit 250, may be provided to the image analysis unit 240 and the tone curve application unit 270.

The image analysis unit 240 may provide at least one of the edge map of the first image and the distribution information of the sample values of the second differential image to the tone curve generation unit 260.

In an embodiment, the distribution information of the sample values of the second differential image may include histogram information of the second differential image. Here, the histogram information may represent the number of samples of the second differential image having predetermined values or values of a predetermined section.

In an embodiment, the distribution information of the sample values of the second differential image may include block-wise histogram information of the second differential image. Here, the block-wise histogram information may represent the number of samples within each block of the second differential image having predetermined values or values of a predetermined section.

The tone curve generation unit 260 may change the parameter value (or the average parameter value) obtained from the neural network 210 according to the sample value of the edge map and may generate a tone curve by using the changed parameter value.

The neural network 210 may output a first parameter map, a second parameter map, and a third parameter map. In an embodiment, the tone curve generation unit 260 may obtain one first average parameter value by averaging sample values of the first parameter map and may obtain one second average parameter value by averaging sample values of the second parameter map. In addition, one third average parameter value may be obtained by averaging sample values of the third parameter map. When the first average parameter value, the second average parameter value, and the third average parameter value are obtained one by one, one tone curve for the second image may be generated.

In another embodiment, the tone curve generation unit 260 may obtain a block-wise first average parameter value by averaging sample values within each block of the first parameter map and may obtain a block-wise second average parameter value by averaging sample values within each block of the second parameter map. In addition, a block-wise third average parameter value may be obtained by averaging sample values within each block of the third parameter map. When the first average parameter value, the second average parameter value, and the third average parameter value are obtained for each block, a plurality of tone curves for each block of the second image may be generated. This is described with reference to FIG. 8.

Figure 8:
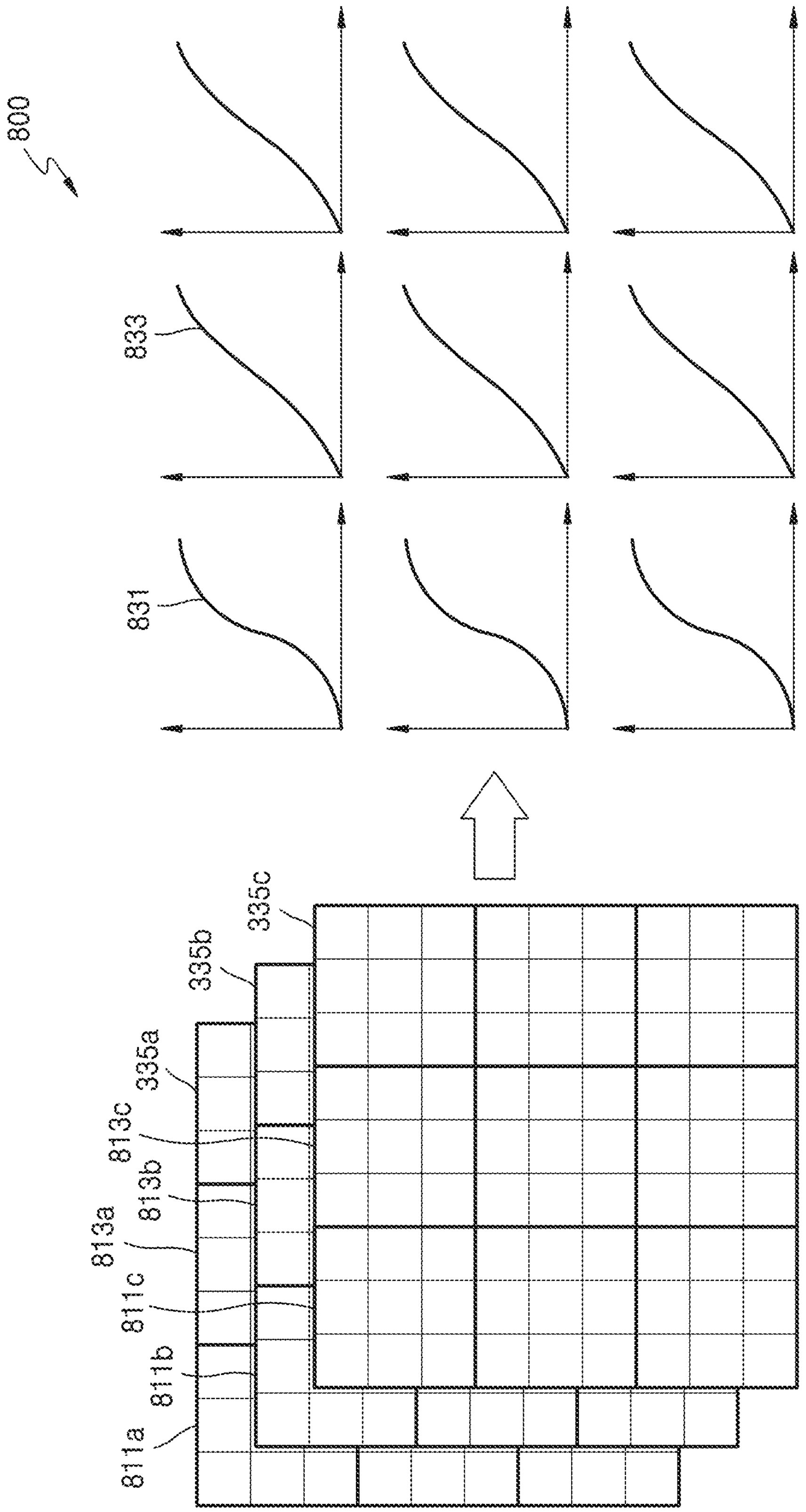
FIG. 8 is a diagram for describing a method of generating a block-wise tone curve from parameter maps output from a neural network, according to an embodiment.

FIG. 8 is a diagram for describing a method of generating a block-wise tone curve 800 from parameter maps 335*a*, 335*b*, and 335*c* output from the neural network 210, according to an embodiment.

The neural network 210 may output the first parameter map 335*a* including first parameter values as sample values, the second parameter map 335*b* including second parameter values as sample values, and the third parameter map 335*c* including third parameter values as sample values.

As described above, when the tone curve generation unit 260 generates one tone curve, the first average parameter value, the second average parameter value, and the third average parameter value may be obtained by averaging the sample values of the first parameter map 335*a*, the sample values of the second parameter map 335*b*, and the sample values of the third parameter map 335*c*. The tone curve generation unit 260 may modify at least one of the first average parameter value, the second average parameter value, and the third average parameter value by taking into account the edge map of the first image and may generate one tone curve by using the modified average parameter values.

When generating a block-wise tone curve 800, the tone curve generation unit 260 may obtain a block-wise first average parameter value, a block-wise second average parameter value, and a block-wise third average parameter value by averaging the sample values included in each of the blocks of the first parameter map 335*a*, the second parameter map 335*b*, and the third parameter map 335*c*.

As illustrated in FIG. 8, when the first parameter map 335*a*, the second parameter map 335*b*, and the third parameter map 335*c* are divided into nine blocks, the tone curve generation unit 260 may obtain a first average parameter value for a first block (an upper left block) 811*a* of the first parameter map 335*a* by averaging sample values in the first block 811*a* of the first parameter map 335*a*, may obtain a second average parameter value for a first block 811*b* of the second parameter map 335*b* by averaging sample values in the first block 811*b* of the second parameter map 335*b*, and may obtain a third average parameter value for a first block 811*c* of the third parameter map 335*c* by averaging sample values in the first block 811*c* of the third parameter map 335*c*.

Similarly, the tone curve generation unit 260 may obtain a first average parameter value for a second block (a block on the right of the upper left block) 813*a* of the first parameter map 335*a* by averaging sample values in the second block 813*a* of the first parameter map 335*a*, may obtain a second average parameter value for a second block 813*b* of the second parameter map 335*b* by averaging sample values in the second block 813*b* of the second parameter map 335*b*, and may obtain a third average parameter value for a second block 813*c* of the third parameter map 335*c* by averaging sample values in the second block 813*c* of the third parameter map 335*c*.

The tone curve generation unit 260 may modify at least one of the block-wise first average parameter value, the block-wise second average parameter value, and the block-wise third average parameter value by taking into account the edge map of the first image, and may generate the block-wise tone curve 800 for the second image by using the modified block-wise average parameter values.

At least one of the block-wise first average parameter value, the block-wise second average parameter value, and the block-wise third average parameter value may be modified, and the samples of the edge map of the first image may also be taken into account for each block. In other words, the block-wise average sample value of the edge map of the first image may be used to modify at least one of the block-wise first average parameter value, the block-wise second average parameter value, and the block-wise third average parameter value.

Referring to FIG. 8, the tone curve generation unit 260 may generate a tone curve 831 for a first block of the second image by using the first average parameter value for the first block 811*a* of the first parameter map 335*a*, the second average parameter value for the first block 811*b* of the second parameter map 335*b*, and the third average parameter value for the first block 811*c* of the third parameter map 335*c*.

In addition, the tone curve generation unit 260 may generate a tone curve 833 for a second block of the second image by using the first average parameter value for the second block 813*a* of the first parameter map 335*a*, the second average parameter value for the second block 813*b* of the second parameter map 335*b*, and the third average parameter value for the second block 813*c* of the third parameter map 335*c*.

Hereinafter, a method, performed by the tone curve generation unit 260, of modifying at least one of the first parameter value (or the first average parameter value), the second parameter value (or the second average parameter value), and the third parameter value (or the third average parameter value) is described.

The tone curve generation unit 260 may determine a fifth gain value corresponding to the sample value of the edge map and may apply the fifth gain value to at least one of the first parameter value, the second parameter value, and the third parameter value. For example, the tone curve generation unit 260 may multiply the fifth gain value by the first parameter value and the third parameter value.

In an embodiment, when the sample value of the edge map is large, the fifth gain value may be determined to be large, and when the sample value of the edge map is small, the fifth gain value may be determined to be small. For example, the sample value of the edge map and the fifth gain value may be proportional to each other.

In an embodiment, the tone curve generation unit 260 may determine one average sample value by averaging the sample values of the edge map and may apply the fifth gain value corresponding to the determined average sample value to at least one of the first average parameter value, the second average parameter value, and the third average parameter value.

In an embodiment, the tone curve generation unit 260 may obtain a block-wise average sample value by averaging the sample values of the edge map for each block and may determine a block-wise fifth gain value corresponding to the block-wise average sample value. In an embodiment, the block-wise fifth gain value may be applied to (e.g., multiplied by) at least one of the block-wise first average parameter value, the block-wise second average parameter value, and the block-wise third average parameter value.

That an average sample value of a block in the edge map is large means that an amount of change in the sample values in the corresponding block within the first image is large. Accordingly, the tone curve application unit 270 may adjust the tone curve for the corresponding block to increase the contrast ratio.

In an embodiment, when the tone curve for the second image is generated, the tone curve generation unit 260 may modify the tone curve by taking into account distribution information of sample values of the second differential image. For example, the tone curve generation unit 260 may determine a sixth gain value from the distribution information of the sample values of the second differential image and may adjust the tone curve by applying the sixth gain value to output sample values mapped to input sample values of the tone curve.

In an embodiment, the distribution information of the sample values of the second differential image may include an average value of the squares of the sample values of the second differential image. When the tone curve is generated for each block of the second image, the distribution information of the sample values of the second differential image may include an average value of the squares of the sample values included in each block within the second differential image.

As the second differential image is an image in which high-frequency components are emphasized by the sharpness adjustment unit 250, a large sample value may mean that it is necessary to improve the contrast ratio for the region including the corresponding sample. That is, the tone curve generation unit 260 may identify a portion in which sharpness is emphasized in the second differential image and may adjust the tone curve so that the contrast ratio of the identified portion is improved.

In an embodiment, the tone curve generation unit 260 may determine the sixth gain value according to an average value of the squares of the sample values of the second differential image. For example, the average value of the squares of the sample values of the second differential image and the sixth gain value may be proportional to each other. Accordingly, as the average value of the squares of the sample values of the second difference image is larger, the sixth gain value may be determined to be large, and as the average value of the squares of the sample values of the second difference image is small, the sixth gain value may be determined to be small.

The tone curve generation unit 260 may provide the modified tone curve to the tone curve application unit 270 according to the distribution information of the sample values of the second differential image.

The tone curve application unit 270 may change the sample values of the second image by using the tone curve received from the tone curve generation unit 260. For example, the tone curve application unit 270 may identify, from the tone curve, output sample values mapped to sample values of the second image and may obtain an output image including the identified output sample values.

When the block-wise tone curve is received from the tone curve generation unit 260, the tone curve application unit 270 may change the sample values of the second image for each block.

A method of applying a block-wise tone curve to a second image 650 is described with reference to FIG. 9.

Figure 9:
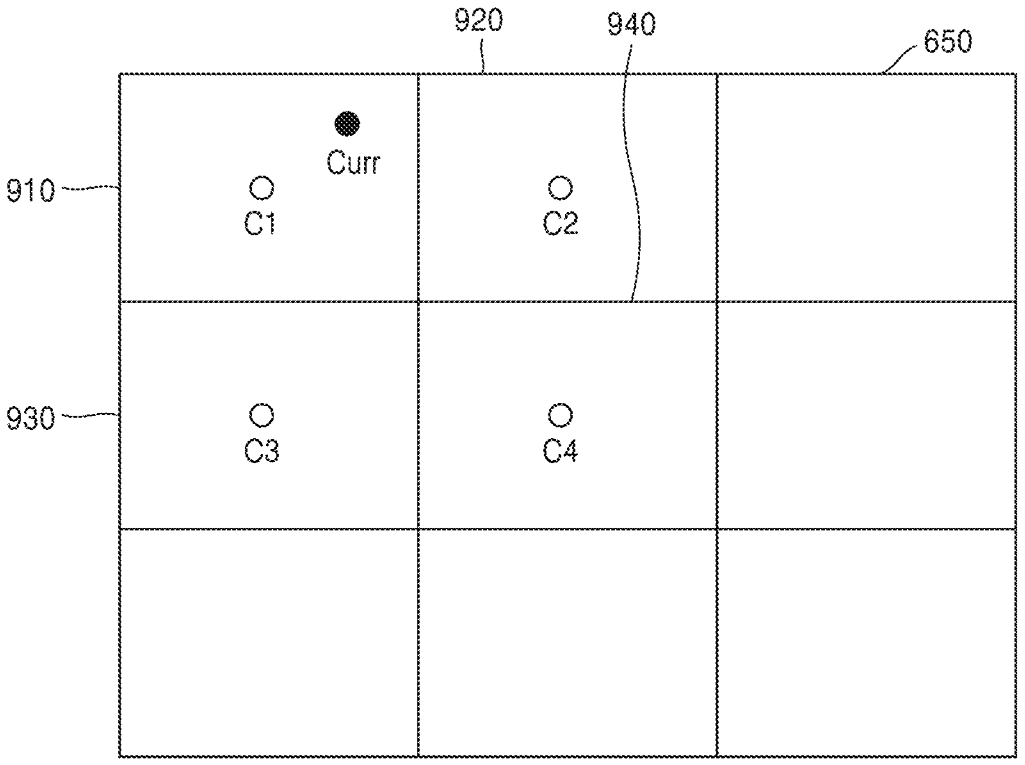
FIG. 9 is a diagram for describing a process of changing a value of a current sample of a second image depending on a tone curve, according to an embodiment.

As illustrated in FIG. 9, when the second image 650 is divided into nine blocks, the tone curve application unit 270 may apply, to each block of the second image 650, each of nine tone curves received from the tone curve generation unit 260.

For example, a tone curve for a first block (an upper left block) 910 of the second image 650 may be applied to samples of the first block 910 of the second image 650, and a tone curve for a second block (a block on the right of the upper left block) 920 of the second image 650 may be applied to samples of the second block 920 of the second image 650.

In an embodiment, when the tone curve is applied to each block of the second image 650, block artifacts may occur in the output image. Accordingly, when the tone curve is applied to samples within one block of the second image 650, the tone curve application unit 270 may also use the tone curves of the neighboring blocks.

Referring to FIG. 9, when changing a current sample curr in the first block 910 of the second image 650, the tone curve application unit 270 may use not only a tone curve for the first block 910, but also tone curves for the neighboring blocks, that is, a tone curve for the second block 920, a tone curve for a fourth block 930, and a tone curve for a fifth block 940.

In an embodiment, the tone curve application unit 270 may obtain a first output sample corresponding to the current sample curr according to the tone curve for the first block 910, may obtain a second output sample corresponding to the current sample curr according to the tone curve for the second block 920, may obtain a third output sample corresponding to the current sample curr according to the tone curve for the fourth block 930, and may obtain a fourth output sample corresponding to the current sample curr according to the tone curve for the fifth block 940.

The tone curve application unit 270 may obtain a final output sample corresponding to the current sample curr by performing a weighted sum or weighted average on the first output sample, the second output sample, the third output sample, and the fourth output sample according to a distance between the current sample curr and a center sample c1 in the first block 910, a distance between the current sample curr and a center sample c2 in the second block 920, a distance between the current sample curr and a center sample c3 in the fourth block 930, and a distance between the current sample curr and a center sample c4 in the fifth block 940.

The weights multiplied by the first output sample, the second output sample, the third output sample, and the fourth output sample may be inversely proportional to the distances between the current sample curr and the center samples c1, c2, c3, and c4 of the respective blocks 1010, 1020, 1030, and 1040. For example, as the distance between the current sample curr and any one of the center samples increases, a smaller weight may be determined for the output sample obtained according to the tone curve for the block including the corresponding center sample. In addition, as the distance between the current sample curr and any one of the center samples decreases, a larger weight may be determined for the output sample obtained according to the tone curve for the block including the corresponding center sample.

In an embodiment, when changing samples within any one block according to the tone curve, the tone curves of the neighboring blocks are also used, and thus, continuity between blocks within the output image may be improved.

Figure 10:
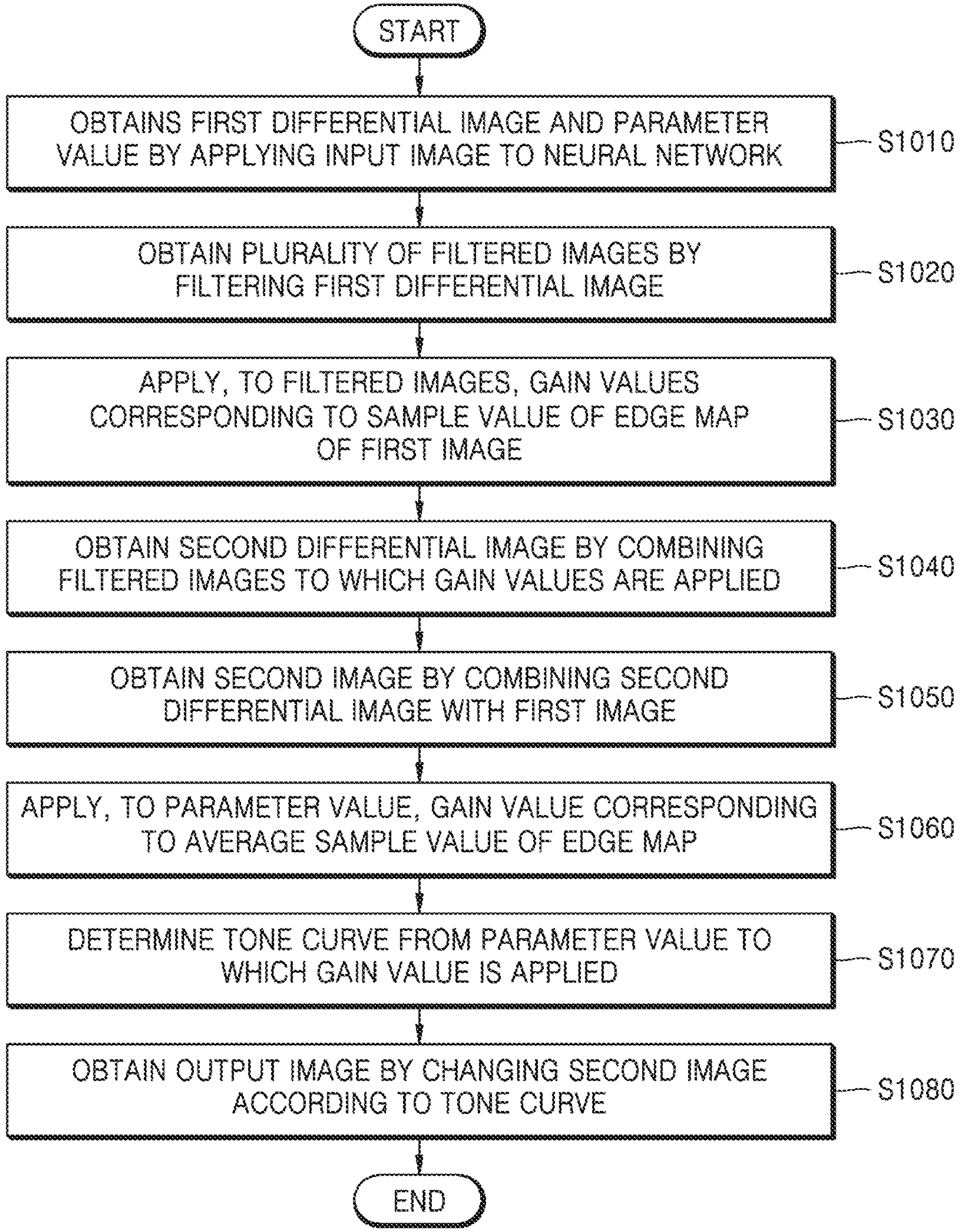
FIG. 10 is a flowchart for describing an image processing method according to an embodiment.

FIG. 10 is a flowchart for describing an image processing method according to an embodiment.

Referring to FIG. 10, in operation S1010, the image processing device 200 obtains a first differential image having a resolution greater than a resolution of an input image and a parameter value for a tone curve by applying the input image to a neural network 210.

In operation S1020, the image processing device 200 obtains a plurality of filtered images by filtering the first differential image. The filtered images may include a filtered image for a low-frequency band and a filtered image for a high-frequency band.

In an embodiment, the filtered images may include a filtered image for a low-frequency band, a filtered image for a mid-frequency band, and a filtered image for a high-frequency band.

In operation S1030, the image processing device 200 applies, to the filtered images, gain values corresponding to a sample value of an edge map of a first image. For example, the image processing device 200 may multiply the gain values corresponding to the sample value of the edge map of the first image by sample values of the filtered images.

In operation S1040, the image processing device 200 obtains a second differential image by combining the filtered images to which the gain values are applied.

In an embodiment, the image processing device 200 may obtain the second differential image by combining the sample values of the filtered images to which the gain values are applied.

In operation S1050, the image processing device 200 obtains a second image by combining the second differential image with the first image. For example, the image processing device 200 may obtain the second image by summing sample values of the second differential image and sample values of the first image.

In an embodiment, the second differential image may be combined with the first image after being modified based on luminance information of the first image.

In operation S1060, the image processing device 200 applies a gain value corresponding to an average sample value of an edge map to a parameter value obtained from the neural network 210. The average sample value of the edge map may be an average of the sample values within the edge map or an average of the sample values of each block within the edge map.

In operation S1070, the image processing device 200 determines a tone curve from the parameter value to which the gain value is applied. In an embodiment, the image processing device 200 may determine a tone curve by using a curve fitting algorithm based on the parameter value.

In operation S1080, the image processing device 200 obtains an output image by changing the second image according to the tone curve.

In an embodiment, the image processing device 200 may modify the tone curve by taking into account distribution information of the sample values of the second differential image and may change the second image according to the modified tone curve.

Hereinafter, a training process of the neural network 210 is described with reference to FIGS. 11 to 13.

Figure 11:
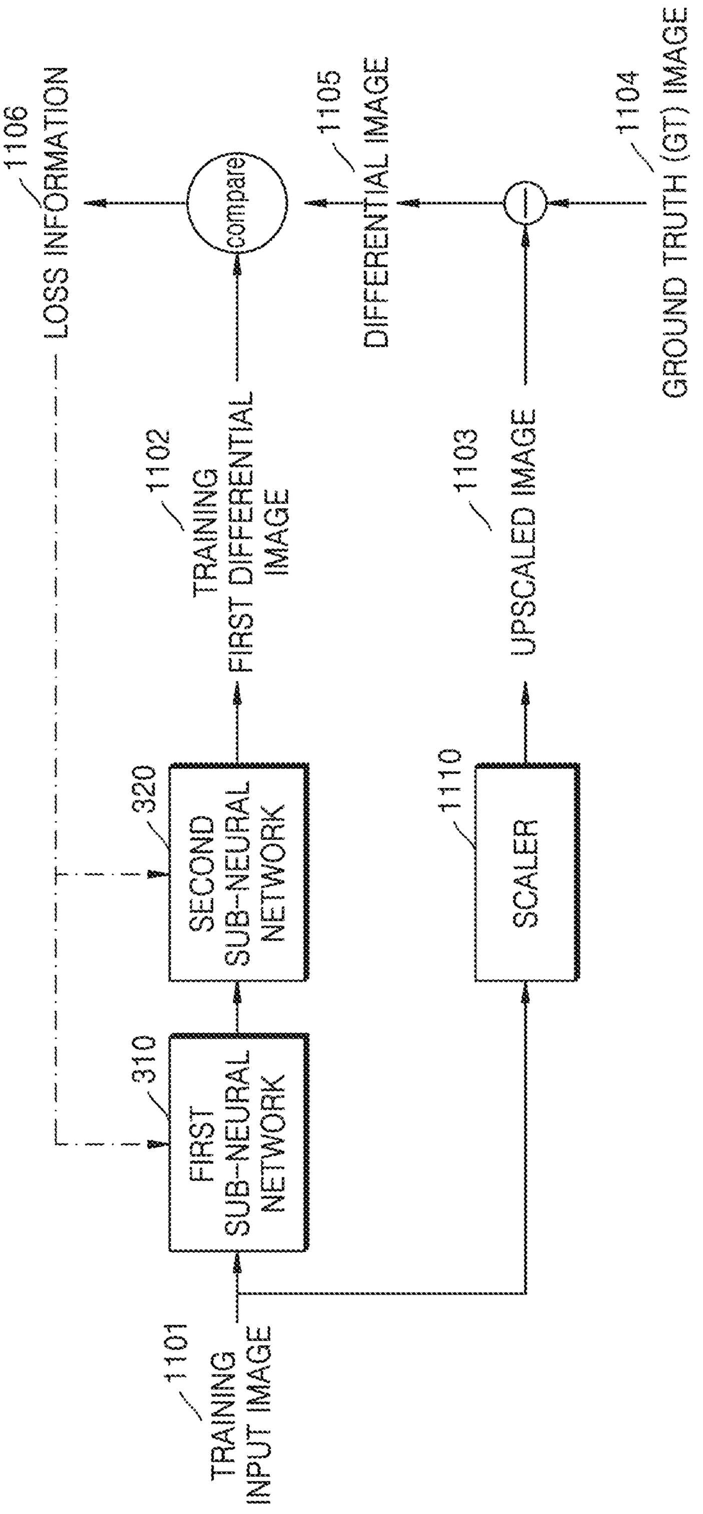
FIG. 11 is a diagram for describing a training process of a first sub-neural network and a second sub-neural network, according to an embodiment.
Figure 12:
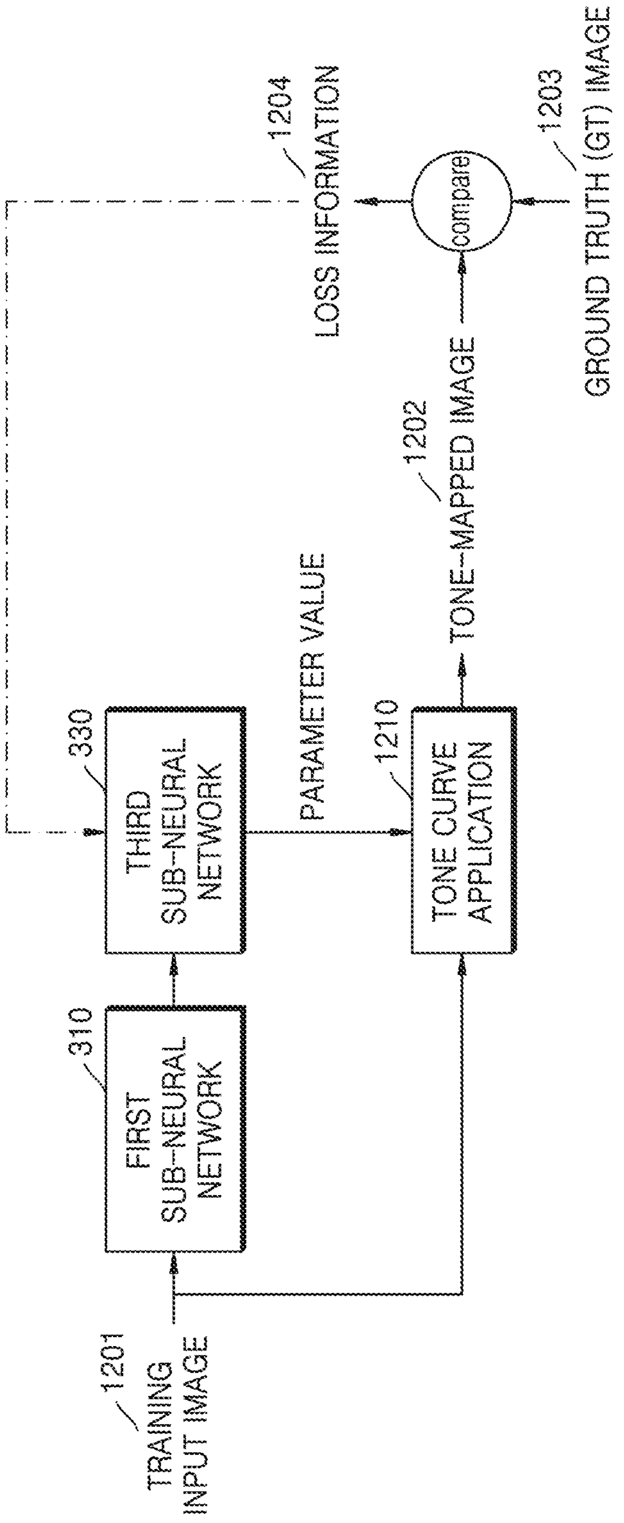
FIG. 12 is a diagram for describing a training process of a third sub-neural network, according to an embodiment.

FIG. 11 is a diagram for describing a training process of a first sub-neural network 310 and a second sub-neural network 320, according to an embodiment, and FIG. 12 is a diagram for describing a training process of a third sub-neural network 330, according to an embodiment.

As described above, the neural network 210 may include the first sub-neural network 310, the second sub-neural network 320, and the third sub-neural network 330. After the training of the first sub-neural network 310 and the second sub-neural network 320 is completed, the third sub-neural network 330 may be additionally trained.

First, referring to FIG. 11, a training input image 1101 may be input to the first sub-neural network 310. The training input image 1101 may correspond to an input image input to the image processing device 200. The training input image 1101 may be obtained by downscaling a GT image 1104.

The first sub-neural network 310 may output a feature map to the second sub-neural network 320 by processing the training input image 1101, and the second sub-neural network 320 may output a training first differential image 1102 by processing the feature map.

The first sub-neural network 310 and the second sub-neural network 320 may process the training input image 1101 and the feature map according to preset neural network parameters.

Separately from the inputting of the training input image 1101 to the first sub-neural network 310, a scaler 1110 may upscale the training input image 1101 and output an upscaled image 1103 having a resolution greater than a resolution of the training input image 1101.

A differential image 1105 corresponding to the difference between the upscaled image 1103 and the GT image 1104 may be compared with the training first difference image 1102, and loss information 1106 may be obtained as a result of the comparing.

The loss information 1106 corresponding to the result of comparing the differential image 1105 and the training first differential image 1102 may include at least one of an L1-norm value, an L2-norm value, an structural similarity (SSIM) value, a peak signal-to-noise ratio-human vision system (PSNR-HVS) value, a multiscale SSIM (MS-SSIM) value, a variance inflation factor (VIF) value, and a video multimethod assessment fusion (VMAF) value for the difference between the differential image 1105 and the training first differential image 1102.

The first sub-neural network 310 and the second sub-neural network 320 may update the neural network parameters so that the loss information 1106 is reduced or minimized.

Next, the third sub-neural network 330 may be trained through a cooperative operation with the trained first sub-neural network 310.

Referring to FIG. 12, a training input image 1201 may be input to a first sub-neural network 310, and the first sub-neural network 310 may output a feature map by processing the training input image 1201 according to neural network parameters set through a training process.

A third sub-neural network 330 may output parameter values (or parameter maps) for a tone curve by processing the feature map according to preset neural network parameters.

The training input image 1201 may be changed to a tone-mapped image 1202 through a tone curve application process 1210 using a tone curve determined from parameter values.

Loss information 1204 corresponding to a result of comparing the tone-mapped image 1202 with the GT image 1203 may be obtained, and the third sub-neural network 330 may update the neural network parameters so that the loss information 1204 is reduced or minimized.

In an embodiment, the first sub-neural network 310, the second sub-neural network 320, and the third sub-neural network 330, which are included in the neural network 210, may be trained together. This will now be described below with reference to FIG. 13.

Figure 13:
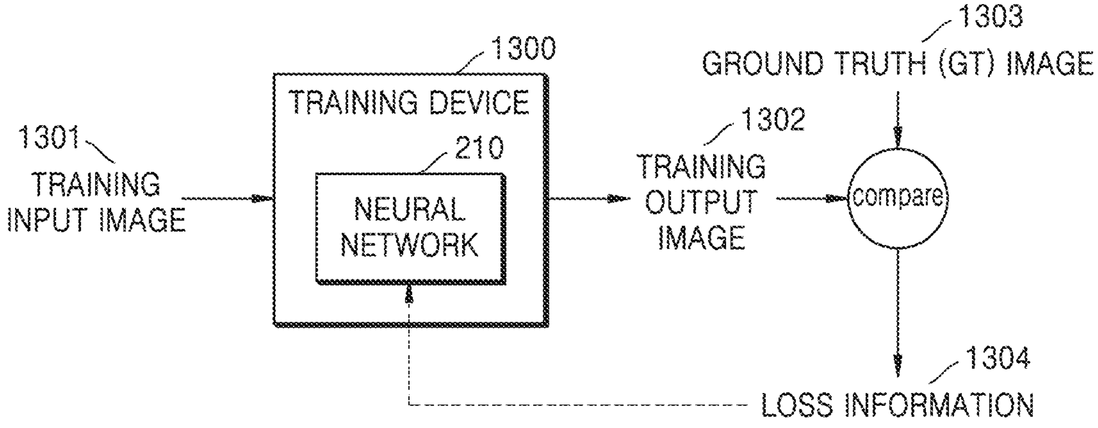
FIG. 13 is a diagram for describing a training process of a first sub-neural network, a second sub-neural network, and a third sub-neural network, according to an embodiment.

FIG. 13 is a diagram for describing the training process of the first sub-neural network 310, the second sub-neural network 320, and the third sub-neural network 330, according to an embodiment.

Referring to FIG. 13, a training input image 1301 may be input to a training device 1300 including the neural network 210. The training device 1300 may correspond to the image processing device 200 described above or a separate server.

Just as the image processing device 200 illustrated in FIG. 2 processes the input image and outputs the output image, the training device 1300 may process the training input image 1301 and output a training output image 1302.

Loss information 1304 corresponding to a result of comparing the training output image 1302 with a GT image 1303 may be obtained. Neural network parameters of the first sub-neural network 310, the second sub-neural network 320, and the third sub-neural network 330, which are included in the neural network 210, may be updated so that the loss information 1304 is reduced or minimized.

On the other hand, regarding FIG. 2, the tone curve application unit 270 has been described as applying the tone curve to the second image, but in an embodiment, the tone curve application unit 270 may also apply the tone curve to the first image. In this case, the image analysis unit 240 may provide, to the tone curve generation unit 260, distribution information of sample values of the first differential image obtained from the neural network 210, instead of the second differential image.

The tone curve generation unit 260 may modify parameter values obtained from the neural network 210 by taking into account the distribution information of the sample values of the first differential image (or the second differential image) and may generate a tone curve for the first image by using the modified parameter values. The tone curve application unit 270 may obtain the third image by applying the tone curve to the first image. An output image may be obtained by combining the second image with the third image.

Figure 14:
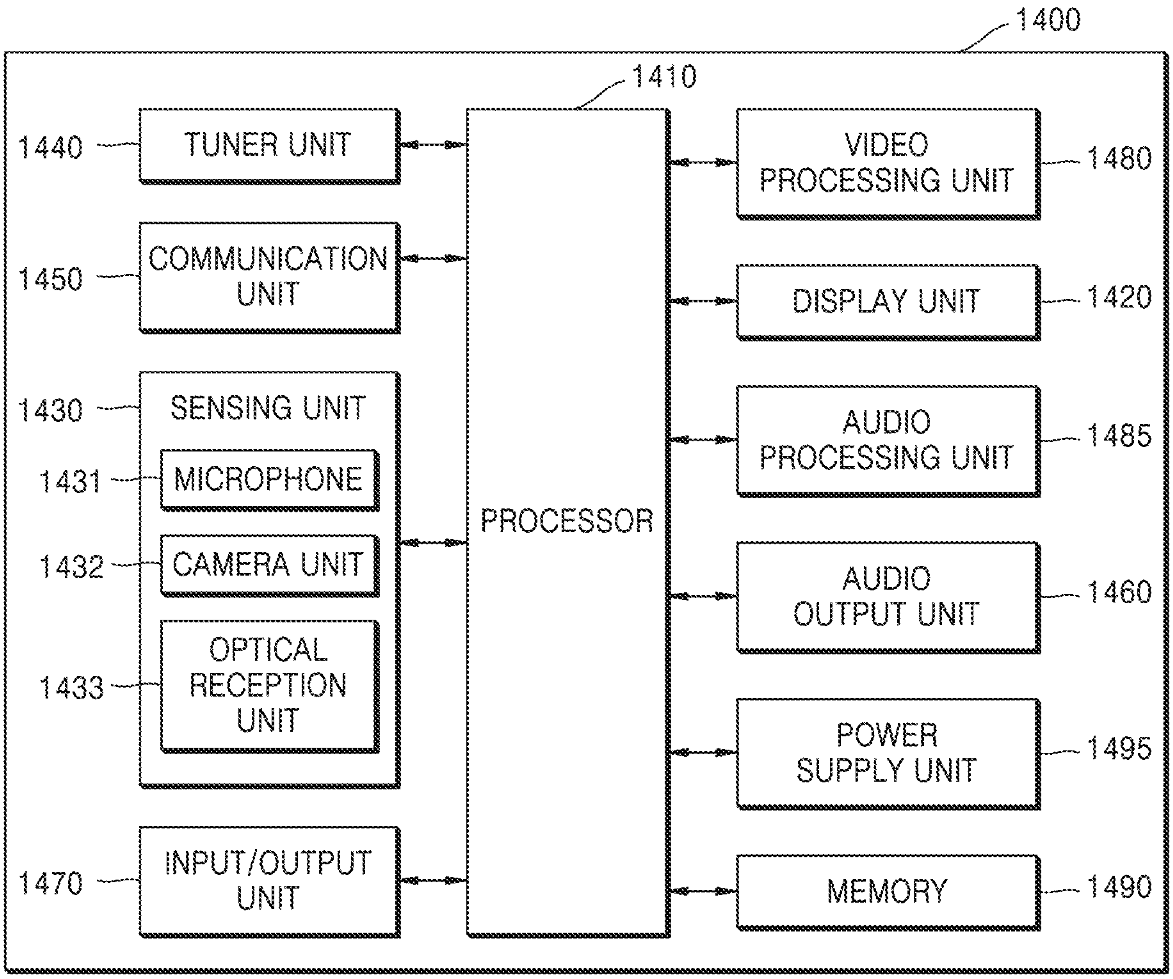
FIG. 14 is a block diagram illustrating a configuration of an image display device including an image processing device, according to an embodiment.

FIG. 14 is a block diagram illustrating a configuration of an image display device 1400 including the image processing device 200, according to an embodiment.

The image display device 1400 illustrated in FIG. 14 may include the image processing device 200 illustrated in FIG. 2.

Referring to FIG. 14, the image display device 1400 according to an embodiment may include a tuner unit 1440, a processor 1410, a display unit 1420, a communication unit 1450, a sensing unit 1430, an input/output unit 1470, a video processing unit 1480, an audio processing unit 1485, an audio output unit 1460, a memory 1490, and a power supply unit 1495.

The tuner unit 1440 according to an embodiment may turn and select only a frequency of a channel to be received among a plurality of radio wave components by amplifying, mixing, resonating, etc. a broadcast signal received in a wired or wireless manner. The broadcast signal includes audio, video, and additional information (e.g., electronic program guide (EPG)).

The tuner unit 1440 may receive broadcast signals from various sources, such as terrestrial broadcasting, cable broadcasting, satellite broadcasting, and Internet broadcasting. The tuner unit 1440 may also receive broadcast signals from sources, such as analog broadcasting or digital broadcasting.

The sensing unit 1430 may sense a user's voice, a user's image, or a user's interaction, and may include a microphone 1431, a camera unit 1432, and an optical reception unit 1433.

The microphone 1431 receives a voice uttered by a user. The microphone 1431 may convert the received voice into an electrical signal and output the electrical signal to the processor 1410. The user's voice may include, for example, a voice corresponding to a menu or a function of the image display device 1400.

The camera unit 1432 may receive images (e.g., consecutive frames).

The optical reception unit 1433 receives an optical signal (including a control signal) from an external control device through an optical window (not shown) of a bezel of the display unit 1420. The optical reception unit 1433 may receive an optical signal corresponding to user input (e.g., touch, press, touch gesture, voice, or motion) from a control device. The control signal may be extracted from the received optical signal under the control of the processor 1410.

The input/output unit 1470 may receive video (e.g., moving images, etc.), audio (e.g., voice, music, etc.), and additional information (e.g., EPG, etc.) from the outside of the image display device 1400 under the control of the processor 1410. The input/output interface may include any one of a high-definition multimedia interface (HDMI), a mobile high-definition link (MHL), a universal serial bus (USB), a display port (DP), a thunderbolt, a video graphics array (VGA) port, an RGB port, a D-subminiature (D-SUB), a digital visual interface (DVI), a component jack, and a PC port.

The processor 1410 controls the overall operation of the image display device 1400 and the signal flow between internal components of the image display device 1400 and performs a data processing function. When there is user input or a preset and stored condition is satisfied, the processor 1410 may execute an operating system (OS) and various applications, which are stored in the memory 1490.

The processor 1410 may include a random access memory (RAM) that stores signals or data input from the outside of the image display device 1400 or is used as a storage area corresponding to various tasks (e.g., an image noise cancellation task) performed in the image display device 1400, a read-only memory (ROM) that stores a control program for controlling the image display device 1400, and a processor.

The video processing unit 1480 performs processing on video data received by the image display device 1400. The video processing unit 1480 may perform a variety of image processing, such as decoding, scaling, noise reduction, frame rate conversion, or resolution conversion, on video data.

The audio processing unit 1485 may perform processing on audio data. The audio processing unit 1485 may perform a variety of processing, such as decoding, amplification, or noise reduction, on audio data. On the other hand, the audio processing unit 1485 may include a plurality of audio processing modules configured to process audio corresponding to a plurality of content.

The audio output unit 1460 outputs audio included in a broadcast signal received through the tuner unit 1440 under the control of the processor 1410. The audio output unit 1460 may output audio (e.g., voice, sound, etc.) input through the communication unit 1450 or the input/output unit 1470. In addition, the audio output unit 1460 may output audio stored in the memory 1490 under the control of the processor 1410. The audio output unit 1460 may include at least one of a speaker, a headphone output terminal, or a Sony/Philips digital interface (S/PDIF) output terminal.

The power supply unit 1495 supplies, to components inside the image display device 1400, power input from an external power source under the control of the processor 1410. In addition, the power supply unit 1495 may supply, to internal components, power output from one or two batteries (not shown) located inside the image display device 1400 under the control of the processor 1410.

The memory 1490 may store a variety of data, programs, or applications that drive and control the image display device 1400 under the control of the processor 1410. The memory 1490 may include a broadcast reception module (not shown), a channel control module (not shown), a volume control module (not shown), a communication control module (not shown), a voice recognition module (not shown), a motion recognition module (not shown), an optical reception module (not shown), a display control module (not shown), an audio control module (not shown), an external input control module (not shown), a power control module (not shown), a power control module (not shown) of an external device connected wirelessly (e.g., via Bluetooth), a voice database (DB) (not shown), or a motion DB (not shown). The modules (not shown) and the DBs (not shown) of the memory 1490 may be implemented in the form of software for performing a broadcast reception control function, a channel control function, a volume control function, a communication control function, a voice recognition function, a motion recognition function, an optical reception control function, a display control function, an audio control function, an external input control function, a power control function, or a power control function of an external device connected wirelessly (e.g., via Bluetooth) in the image display device 1400. The processor 1410 may perform each function by using the software stored in the memory 1490.

On the other hand, the block diagram of the image display device 1400 illustrated in FIG. 14 is a block diagram for an embodiment. Each element of the block diagram may be integrated, added, or omitted according to the specifications of the image display device 1400 that is actually implemented. That is, when necessary, two or more elements may be integrated into one element, or one element may be subdivided into two or more elements. In addition, the functions performed by each block are for describing the embodiments, and specific operations or devices thereof are not intended to limit the scope of the present disclosure.

The image processing device 200 and method according to an embodiment aim to make a lightweight neural network used for image processing.

In addition, the image processing device 200 and method according to an embodiment aim to further improve image quality of an image obtained through image processing.

An image processing device 200 according to an embodiment may include: a memory configured to store at least one instruction; and at least one processor configured to operate according to the at least one instruction.

In an embodiment, the at least one processor may obtain a first differential image having a resolution greater than a resolution of an input image and a parameter value for a tone curve by applying the input image to a neural network 210.

In an embodiment, the at least one processor may obtain a plurality of filtered images for different frequency bands by filtering the first differential image.

In an embodiment, the at least one processor may apply, to each of the plurality of filtered images, gain values corresponding to sample values of an edge map of a first image upscaled from the input image.

In an embodiment, the at least one processor may obtain a second differential image by combining the plurality of filtered images to which the gain values are applied.

In an embodiment, the at least one processor may obtain a second image by combining the second differential image with the first image.

In an embodiment, the at least one processor may apply, to the parameter value, a gain value corresponding to an average sample value of the edge map.

In an embodiment, the at least one processor may determine a tone curve from the parameter value to which the gain value is applied.

In an embodiment, the at least one processor may obtain an output image by changing sample values of the second image according to the determined tone curve.

In an embodiment, the neural network 210 may include: a first sub-neural network 310 configured to output a feature map by processing the input image; a second sub-neural network 320 configured to output the first differential image by processing the feature map output from the first sub-neural network 310; and a third sub-neural network 330 configured to output the parameter value by processing the feature map output from the first sub-neural network 310.

In an embodiment, the gain values corresponding to the sample value of the edge map may include a first gain value applied to a filtered image for a first frequency band and a second gain value applied to a filtered image for a second frequency band, the first frequency band may be greater than the second frequency band, and when the sample value of the edge map is greater than a preset value, the first gain value may be determined to be greater than the second gain value.

In an embodiment, the at least one processor may be further configured to change the second differential image according to luminance information of the first image and obtain the second image by combining the changed second differential image with the first image.

In an embodiment, the luminance information may include a luminance value of the first image.

In an embodiment, the at least one processor may be further configured to apply, to a sample of the second differential image, a gain value corresponding to the luminance value.

In an embodiment, the at least one processor may be further configured to adjust the determined tone curve according to distribution information of sample values of the second differential image and obtain the output image by changing the sample values of the second image according to the adjusted tone curve.

In an embodiment, the distribution information of the sample values may include an average value of squares of the sample values of the second image.

In an embodiment, the at least one processor may be further configured to adjust the tone curve by applying a gain value corresponding to the average value to output sample values mapped to input sample values of the tone curve.

In an embodiment, the tone curve may include tone curves respectively corresponding to blocks of the second image.

In an embodiment, the at least one processor may be further configured to: obtain a first output sample corresponding to a current sample according to a tone curve corresponding to the current block including a current sample of the second image, obtain second output samples corresponding to the current sample according to tone curves corresponding to neighboring blocks adjacent to the current block, and obtain a final output sample of the output image corresponding to the current sample by performing a weighted sum on the first output sample and the second output samples according to a distance between the current sample and a center sample of the current block and distances between the current sample and center samples of the neighboring blocks.

An image processing method according to an embodiment may include obtaining a first differential image having a resolution greater than a resolution of an input image and a parameter value for a tone curve by applying the input image to a neural network 210.

In an embodiment, the image processing method may include obtaining a plurality of filtered images for different frequency bands by filtering the first differential image.

In an embodiment, the image processing method may include applying, to each of the plurality of filtered images, gain values corresponding to sample values of an edge map of a first image upscaled from the input image.

In an embodiment, the image processing method may include obtaining a second differential image by combining the plurality of filtered images to which the gain values are applied.

In an embodiment, the image processing method may include obtaining a second image by combining the second differential image with the first image.

In an embodiment, the image processing method may include applying, to the parameter value, a gain value corresponding to an average sample value of the edge map.

In an embodiment, the image processing method may include determining a tone curve from the parameter value to which the gain value is applied.

In an embodiment, the image processing method may include obtaining an output image by changing sample values of the second image according to the determined tone curve.

In an embodiment, the gain values corresponding to the sample value of the edge map may include a first gain value applied to a filtered image for a first frequency band and a second gain value applied to a filtered image for a second frequency band, the first frequency band may be greater than the second frequency band, and when the sample value of the edge map is greater than a preset value, the first gain value may be determined to be greater than the second gain value.

In an embodiment, the obtaining of the second image may include: changing the second differential image according to luminance information of the first image; and obtaining the second image by combining the changed second differential image with the first image.

In an embodiment, the obtaining of the output image may include: adjusting the determined tone curve according to distribution information of sample values of the second differential image; and obtaining the output image by changing the sample values of the second image according to the adjusted tone curve.

As the image processing device 200 and method according to an embodiment may utilize a single neural network to improve the resolution and contrast ratio of an image, the neural network used for image processing may be made lightweight.

In addition, the image processing device 200 and method according to an embodiment may further improve image quality by sharing data representing characteristics of the image with different algorithms for image processing.

In addition, the image processing device 200 and method according to an embodiment may improve image sharpness and contrast ratio together in micro block units by combining existing pixel-centered sharpness improvement and block-centered contrast ratio improvement.

On the other hand, the embodiments of the present disclosure may be written as a program that is executable on a computer, and the written program may be stored in a machine-readable storage medium.

The machine-readable storage medium may be provided in the form of a non-transitory storage medium. The "non-transitory storage medium" is a tangible device and only means not including a signal (e.g., electromagnetic waves). This term does not distinguish between a case where data is semi-permanently stored in a storage medium and a case where data is temporarily stored in a storage medium. For example, the non-transitory storage medium may include a buffer in which data is temporarily stored.

According to an embodiment, the methods according to various embodiments of the present disclosure may be provided by being included in a computer program product. The computer program product may be traded between a seller and a buyer as commodities. The computer program product may be distributed in the form of a machine-readable storage medium (e.g., compact disc read-only memory (CD-ROM)), or may be distributed (e.g., downloaded or uploaded) online either via an application store or directly between two user devices (e.g., smartphones). In the case of the online distribution, at least a part of a computer program product (e.g., downloadable app) is stored at least temporarily on a machine-readable storage medium, such as a server of a manufacturer, a server of an application store, or a memory of a relay server, or may be temporarily generated.

The technical concept of the present disclosure has been described in detail with reference to embodiments, but the technical concept of the present disclosure is not limited to the above embodiments, and various modifications and variations may be made thereto by those of ordinary skill in the art within the scope of the technical concept of the present disclosure.

What is claimed is:

1. An image processing device comprising:

a memory configured to store at least one instruction; and at least one processor, wherein the at least one instruction, when executed by the at least one processor, causes the image processing device to:

obtain a first differential image having a resolution greater than a resolution of an input image and a parameter value for a tone curve by applying the input image to a neural network;

obtain a plurality of filtered images for different frequency bands by filtering the first differential image;

apply, to each filtered image among the plurality of filtered images, gain values corresponding to a sample value of an edge map of a first image upscaled from the input image;

obtain a second differential image by combining the plurality of filtered images to which the gain values are applied;

obtain a second image by combining the second differential image with the first image;

apply, to the parameter value, a gain value corresponding to an average sample value of the edge map;

identify a tone curve from the parameter value to which the gain value is applied; and obtain an output image by changing sample values of the second image according to the identified tone curve.

2. The image processing device of claim 1, wherein the neural network comprises:

a first sub-neural network configured to output a feature map by processing the input image;

a second sub-neural network configured to output the first differential image by processing the feature map output from the first sub-neural network; and a third sub-neural network configured to output the parameter value by processing the feature map output from the first sub-neural network.

3. The image processing device of claim 1, wherein the gain values corresponding to the sample value of the edge map comprise a first gain value applied to a first filtered image for a first frequency band and a second gain value applied to a second filtered image for a second frequency band, wherein the first frequency band is greater than the second frequency band, and wherein based on the sample value of the edge map being greater than a preset value, the first gain value is determined to be greater than the second gain value.

4. The image processing device of claim 1, wherein the at least one instruction, when executed by the at least one processor, causes the image processing device to:

change the second differential image according to luminance information of the first image; and obtain the second image by combining the changed second differential image with the first image.

5. The image processing device of claim 4, wherein the luminance information comprises a luminance value of the first image, and wherein the at least one instruction, when executed by the at least one processor, causes the image processing device to apply, to a sample of the second differential image, a gain value corresponding to the luminance value.

6. The image processing device of claim 1, wherein the at least one instruction, when executed by the at least one processor, causes the image processing device to:

adjust the identified tone curve according to distribution information of sample values of the second differential image; and obtain the output image by changing the sample values of the second image according to the adjusted tone curve.

7. The image processing device of claim 6, wherein the distribution information of the sample values comprises an average value of squares of the sample values of the second image, and wherein the at least one instruction, when executed by the at least one processor, causes the image processing device to adjust the tone curve by applying a gain value corresponding to the average value to output sample values mapped to input sample values of the tone curve.

8. The image processing device of claim 1, wherein the tone curve comprises tone curves respectively corresponding to blocks of the second image, and wherein the at least one instruction, when executed by the at least one processor, causes the image processing device to:

obtain a first output sample corresponding to a current sample according to a tone curve corresponding to a current block including a current sample of the second image;

obtain second output samples corresponding to the current sample according to tone curves corresponding to neighboring blocks adjacent to the current block; and obtain a final output sample of the output image corresponding to the current sample by performing a weighted sum on the first output sample and the second output samples according to a distance between the current sample and a center sample of the current block and distances between the current sample and center samples of the neighboring blocks.

9. An image processing method performed by an image processing device, the image processing method comprising:

obtaining a first differential image having a resolution greater than a resolution of an input image and a parameter value for a tone curve by applying the input image to a neural network;

obtaining a plurality of filtered images for different frequency bands by filtering the first differential image;

applying, to each filtered image among the plurality of filtered images, gain values corresponding to a sample value of an edge map of a first image upscaled from the input image;

obtaining a second differential image by combining the plurality of filtered images to which the gain values are applied;

obtaining a second image by combining the second differential image with the first image;

applying, to the parameter value, a gain value corresponding to an average sample value of the edge map;

identifying a tone curve from the parameter value to which the gain value is applied; and obtaining an output image by changing sample values of the second image according to the identified tone curve.

10. The image processing method of claim 9, wherein the gain values corresponding to the sample value of the edge map comprise a first gain value applied to a first filtered image for a first frequency band and a second gain value applied to a second filtered image for a second frequency band, wherein the first frequency band is greater than the second frequency band, and wherein based on the sample value of the edge map being greater than a preset value, the first gain value is determined to be greater than the second gain value.

11. The image processing method of claim 9, wherein the obtaining of the second image comprises:

changing the second differential image according to luminance information of the first image; and obtaining the second image by combining the changed second differential image with the first image.

12. The image processing method of claim 9, wherein the obtaining of the output image comprises:

adjusting the determined tone curve according to distribution information of sample values of the second differential image; and obtaining the output image by changing the sample values of the second image according to the adjusted tone curve.

13. A non-transitory computer-readable recording medium having recorded thereon a program for causing a computer to perform an image processing method comprising:

obtaining a first differential image having a resolution greater than a resolution of an input image and a parameter value for a tone curve by applying the input image to a neural network;

obtaining a plurality of filtered images for different frequency bands by filtering the first differential image;

applying, to each filtered image among the plurality of filtered images, gain values corresponding to a sample value of an edge map of a first image upscaled from the input image;

obtaining a second differential image by combining the plurality of filtered images to which the gain values are applied;

obtaining a second image by combining the second differential image with the first image;

applying, to the parameter value, a gain value corresponding to an average sample value of the edge map;

identifying a tone curve from the parameter value to which the gain value is applied; and obtaining an output image by changing sample values of the second image according to the identified tone curve.

* * * * *